(12) United States Patent
Oshima

(10) Patent No.: US 8,451,464 B2
(45) Date of Patent: May 28, 2013

(54) INFORMATION PROCESSING APPARATUS, INFORMATION PROCESSING METHOD, AND STORAGE MEDIUM

(75) Inventor: Keita Oshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 536 days.

(21) Appl. No.: 12/490,873

(22) Filed: Jun. 24, 2009

(65) Prior Publication Data
US 2009/0323096 A1 Dec. 31, 2009

(30) Foreign Application Priority Data

Jun. 25, 2008 (JP) ................................. 2008-166430

(51) Int. Cl.
*G06F 3/12* (2006.01)
(52) U.S. Cl.
USPC .......................................... 358/1.13; 358/1.1
(58) Field of Classification Search
USPC ..................... 358/1.13, 1.14, 1.15, 1.16, 1.17, 358/1.18, 1.1
See application file for complete search history.

(56) References Cited

U.S. PATENT DOCUMENTS

| | | | |
|---|---|---|---|
| 7,911,626 B2 * | 3/2011 | Ferlitsch | 358/1.13 |
| 2003/0103232 A1 * | 6/2003 | Twede | 358/1.15 |
| 2005/0068547 A1 * | 3/2005 | Negishi et al. | 358/1.1 |
| 2005/0248804 A1 * | 11/2005 | Goel et al. | 358/1.15 |
| 2006/0178924 A1 * | 8/2006 | Yagiura | 705/8 |
| 2007/0013943 A1 * | 1/2007 | Sawayanagi et al. | 358/1.15 |
| 2007/0038313 A1 * | 2/2007 | Bridges et al. | 700/17 |
| 2008/0063423 A1 * | 3/2008 | Matoba | 399/76 |
| 2008/0144091 A1 | 6/2008 | Oshima | |

FOREIGN PATENT DOCUMENTS

JP 2003-276150 9/2003

* cited by examiner

*Primary Examiner* — Thomas D Lee
(74) *Attorney, Agent, or Firm* — Fitzpatrick, Cella, Harper & Scinto

(57) ABSTRACT

An obtaining unit obtains, from a connected apparatus, performance data related to a function of the apparatus. If it is determined the apparatus includes a plurality of functions based on the obtained performance data, information of individual processes related to the plurality of processes is divided in the obtained performance data. The individual processes are used to generate a workflow.

4 Claims, 32 Drawing Sheets

FIG. 11

```
1   <JDF>
2   <JDF Type="LayoutPreparation" ID="id001">
3    <ResourceLinkPool>
4     <DeviceLink rRef="d001"/>
5     <RunListLink rRef="r001" Usage="Input"/>
6     <LayoutPreparationParamsLink rRef="r002" Usage="Input"/>
7     <RunListLink rRef="r003" Usage="Output" />
8    </ResourceLinkPool>
9   </JDF>
10  <JDF Type="Combined" Types="DigitalPrinting" ID="id002">
11   <ResourceLinkPool>
12    <DeviceLink rRef="d002"/>
13    <RunListLink rRef="r003" Usage="Input"/>
14    <DigitalPrintingParamsLink rRef="r011" Usage="Input"/>
15    <MediaLink rRef="r012" Usage="Input"/>
16    <ComponentLink rRef="r015" Usage="Output"/>
17   </ResourceLinkPool>
18  </JDF>
19  <JDF Type="Stitching" ID="id003">
20   <ResourceLinkPool>
21    <DeviceLink rRef="d003"/>
22    <ComponentLink rRef="r015" Usage="Input"/>
23    <StitchingParamsLink rRef="r021" Usage="Input"/>
24    <MediaLink rRef="r022" Usage="Input"/>
25    <ComponentLink rRef="r023" Usage="Output"/>
26   </ResourceLinkPool>
27  </JDF>
28  <ResourcePool>
29   <Device ID="d001" name="Sys X"/>
30   <Device ID="d002" name="Dev E"/>
31   <Device ID="d003" name="Dev C"/>
32   <RunList ID="r001" Filename="input.pdf"/>
33   <LayoutPreparationParams ID="r002" NumberUp="2 2"
          Sides="TwoSidedFlipX" ImageShift="10 12" />
34   <RunList ID="r003" />
35   <DigitalPrintingParams ID="r011" DensityAdjustment="3" NumberOfCopies="4"
          Sides="TwoSidedFlipX"/>
36   <Media ID="r012" Type="Coated3" Size="A4"/>
37   <Component ID="r015"/>
38   <StitchingParams ID="r021" StitchPosition="UpperLeftCorner"/>
39   <Media ID="r022" Type="Coated3" Size="A4"/>
40   <Component ID="r023"/>
41  </ResourcePool>
42  </JDF>
```

FIG. 12

```
1   <JDF>
2   <JDF Type="LayoutPreparation" ID="id001">
3    <ResourceLinkPool>
4     <DeviceLink rRef="d001"/>
5     <RunListLink rRef="r001" Usage="Input"/>
6     <LayoutPreparationParamsLink rRef="r002" Usage="Input"/>
7     <RunListLink rRef="r003" Usage="Output" />
8    </ResourceLinkPool>
9   </JDF>
10  <ResourcePool>
11   <Device ID="d001" name="Sys X"/>
12   <RunList ID="r001" Filename="input.pdf"/>
13   <LayoutPreparationParams ID="r002" NumberUp="2 2"
            Sides="TwoSidedFlipX" ImageShift="10 12" />
14   <RunList ID="r003" />
15  </ResourcePool>
16  </JDF>
```

FIG. 13

```
1   <JDF>
2   <JDF Type="Combined" Types="DigitalPrinting" ID="id002">
3    <ResourceLinkPool>
4     <DeviceLink rRef="d002"/>
5     <RunListLink rRef="r003" Usage="Input"/>
6     <DigitalPrintingParamsLink rRef="r011" Usage="Input"/>
7     <MediaLink rRef="r012" Usage="Input"/>
8     <ComponentLink rRef="r015" Usage="Output"/>
9    </ResourceLinkPool>
10  </JDF>
11  <ResourcePool>
12   <Device ID="d002" name="Dev E"/>
13   <RunList ID="r003" />
14   <DigitalPrintingParams ID="r011" DensityAdjustment="3"
            NumberOfCopies="4" Sides="TwoSidedFlipX"/>
15   <Media ID="r012" Type="Coated3" Size="A4"/>
16   <Component ID="r015"/>
17  </ResourcePool>
18  </JDF>
```

FIG. 14

```
1   <JDF>
2     <JDF Type="Stitching" ID="id003">
3       <ResourceLinkPool>
4         <DeviceLink rRef="d003"/>
5         <ComponentLink rRef="r015" Usage="Input"/>
6         <StitchingParamsLink rRef="r021" Usage="Input"/>
7         <MediaLink rRef="r022" Usage="Input"/>
8         <ComponentLink rRef="r023" Usage="Output"/>
9       </ResourceLinkPool>
10    </JDF>
11    <ResourcePool>
12      <Device ID="d003" name="Dev C"/>
13      <Component ID="r015"/>
14      <StitchingParams ID="r021" StitchPosition="UpperLeftCorner"/>
15      <Media ID="r022" Type="Coated3" Size="A4"/>
16      <Component ID="r023"/>
17    </ResourcePool>
18  </JDF>
```

FIG. 15

```
1   <JDF>
2   <JDF Type="LayoutPreparation" ID="id001">
3     <ResourceLinkPool>
4       <DeviceLink rRef="d001"/>
5       <RunListLink rRef="r001" Usage="Input"/>
6       <LayoutPreparationParamsLink rRef="r002" Usage="Input"/>
7       <RunListLink rRef="r003" Usage="Output" />
8     </ResourceLinkPool>
9   </JDF>
10  <JDF Type="Combined" Types="DigitalPrinting" ID="id002">
11    <ResourceLinkPool>
12      <DeviceLink rRef="d002"/>
13      <RunListLink rRef="r003" Usage="Input"/>
14      <DigitalPrintingParamsLink rRef="r011" Usage="Input"/>
15      <MediaLink rRef="r012" Usage="Input"/>
16      <ComponentLink rRef="r015" Usage="Output"/>
17    </ResourceLinkPool>
18  </JDF>
19  <JDF Type="Combined" Types="Stitching" ID="id003">
20    <ResourceLinkPool>
21      <DeviceLink rRef="d002"/>
22      <ComponentLink rRef="r015" Usage="Input"/>
23      <StitchingParamsLink rRef="r013" Usage="Input"/>
24      <ComponentLink rRef="r023" Usage="Output"/>
25    </ResourceLinkPool>
26  </JDF>
27  <ResourcePool>
28    <Device ID="d001" name="Sys X"/>
29    <Device ID="d002" name="Dev E"/>
30    <RunList ID="r001" Filename="input.pdf"/>
31    <LayoutPreparationParams ID="r002" NumberUp="2 2"
            Sides="TwoSidedFlipX" ImageShift="10 12" />
32    <RunList ID="r003" />
33    <DigitalPrintingParams ID="r011" DensityAdjustment="3"
            NumberOfCopies="4" Sides="TwoSidedFlipX"/>
34    <Media ID="r012" Type="Coated3" Size="A4"/>
35    <StitchingParams ID="r013" NoOp="false" StitchPosition="UpperLeftCorner"/>
36    <Component ID="r015"/>
37    <Component ID="r023"/>
38  </ResourcePool>
39  </JDF>
```

FIG. 16

```
1   <JDF>
2   <JDF Type="LayoutPreparation" ID="id001">
3    <ResourceLinkPool>
4     <DeviceLink rRef="d001"/>
5     <RunListLink rRef="r001" Usage="Input"/>
6     <LayoutPreparationParamsLink rRef="r002" Usage="Input"/>
7     <RunListLink rRef="r003" Usage="Output" />
8    </ResourceLinkPool>
9   </JDF>
10   <ResourcePool>
11    <Device ID="d001" name="Sys X"/>
12    <RunList ID="r001" Filename="input.pdf"/>
13    <LayoutPreparationParams ID="r002" NumberUp="2 2"
          Sides="TwoSidedFlipX" ImageShift="10 12" />
14    <RunList ID="r003" />
15   </ResourcePool>
16  </JDF>
```

FIG. 17

```
1   <JDF>
2   <JDF Type="Combined" Types="DigitalPrinting Stitching" ID="id002">
3     <ResourceLinkPool>
4       <DeviceLink rRef="d002"/>
5       <RunListLink rRef="r003" Usage="Input"/>
6       <DigitalPrintingParamsLink rRef="r011" Usage="Input"/>
7       <MediaLink rRef="r012" Usage="Input"/>
8       <StitchingParamsLink rRef="r013" Usage="Input"/>
9       <ComponentLink rRef="r023" Usage="Output"/>
10    </ResourceLinkPool>
11  </JDF>
12    <ResourcePool>
13      <Device ID="d002" name="Dev E"/>
14      <RunList ID="r003" />
15      <DigitalPrintingParams ID="r011" DensityAdjustment="3"
             NumberOfCopies="4" Sides="TwoSidedFlipX"/>
16      <Media ID="r012" Type="Coated3" Size="A4"/>
17      <StitchingParams ID="r013" NoOp="false"
             StitchPosition="UpperLeftCorner"/>
18      <Component ID="r023"/>
19    </ResourcePool>
20  </JDF>
```

FIG. 18

```
1   <DeviceCap Types="LayoutPreparation" DeviceName="Sys X">
2     <DevCaps Name="RunList" LinkUsage="Input" TypeIndex="0">
3       <StringState Name="Filename" AllowedRegExp=".*"/>
4     </DevCaps>
5     <DevCaps Name="LayoutPreparationParams" LinkUsage="Input" TypeIndex="0">
6       <XYPairState Name="NumberUp" AllowedValueList="1 1 ~ 2 2"/>
7       <NameState Name="Sides"
            AllowedValueList="OneSidedFront OneSidedBack TwoSidedFlipX TwoSidedFlipY"/>
8       <XYPairState Name="ImageShift" AllowedValueList="-100 -100 ~ 100 100"/>
9     </DevCaps>
10    <DevCaps Name="RunList" LinkUsage="Output" TypeIndex="0"/>
11  </DeviceCap>
```

FIG. 19

```
1   <DeviceCap CombinedMethod="Combined" Types="DigitalPrinting Stitching HoleMaking"
        DeviceName="Dev E">
2   <DevCaps Name="RunList" LinkUsage="Input" TypeIndex="0"/>
3   <DevCaps Name="DigitalPrintingParams" LinkUsage="Input" TypeIndex="0">
4     <IntegerState Name="DensityAdjustment" AllowedValueList="-8 ~ 7" Description="Density Adjustment"/>
5     <IntegerState Name="NumberOfCopies" AllowedValueList="1 ~ 10000" Description="Number of Copies"/
6     <EnumerationState Name="Sides"
          AllowedValueList="OneSidedFront OneSidedBack TwoSidedFlipX TwoSidedFlipY"
          Description="Two Sided Designation"/>
7   </DevCaps>
8   <DevCaps Name="Media" LinkUsage="Input" TypeIndex="0">
9     <EnumerationState Name="Type" AllowedValueList="Plain Coated1 Coated2 Coated3 Transparency"
          Description="Paper Type"/>
10    <EnumerationState Name="Size" AllowedValueList="A3 A4 Letter Legal Ledger"
          Description="Paper Size"/>
11  </DevCaps>
12  <DevCaps Name="Component" TypeIndex="0 1"/>
13  <DevCaps Name="StitchingParams" LinkUsage="Input" TypeIndex="1">
14    <BooleanState Name="NoOp" AllowedValueList="true false" Description="Staple"
          ValueDesc="OFF ON"/>
15    <EnumerationState Name="StitchPosition"
          AllowedValueList="UpperLeftCorder UpperRightCorner LeftSide UpperSide RightSide"
          Description="Position" ValueDesc="Upper Left Upper Right Left Up Right"/>
16  </DevCaps>
17  <DevCaps Name="Component" TypeIndex="1 2"/>
18  <DevCaps Name="HoleMakingParams" LinkUsage="Input" TypeIndex="2">
19    <BooleanState Name="NoOp" AllowedValueList="true false" Description="Punch"
          ValueDesc="OFF ON"/>
20    <EnumerationState Name="PunchPosition" AllowedValueList="LeftSide UpperSide RightSide"
          Description="Position" ValueDesc="Left Up Right"/>
21  </DevCaps>
22  <DevCaps Name="Component" LinkUsage="Output" TypeIndex="2"/>
23  </DeviceCap>
```

FIG. 20

```
1   <DeviceCap Types="Stitching" DeviceName="Dev C">
2     <DevCaps Name="Component" LinkUsage="Input" TypeIndex="0"/>
3     <DevCaps Name="StitchingParams" LinkUsage="Input" TypeIndex="0">
4       <EnumerationState Name="StitchPosition"
        AllowedValueList="UpperLeftCorder UpperRightCorner LeftSide UpperSide RightSide"/>
5     </DevCaps>
6     <DevCaps Name="Media" LinkUsage="Input" TypeIndex="0">
7       <EnumerationState Name="Type"
              AllowedValueList="Plain Coated1 Coated2 Coated3 Transparency"/>
8       <EnumerationState Name="Size" AllowedValueList="A3 A4 Letter Legal Ledger"/>
9     </DevCaps>
10    <DevCaps Name="Component" LinkUsage="Output" TypeIndex="0"/>
11  </DeviceCap>
```

FIG. 21

```
1   <DeviceCap CombinedMethod="Combined" Types="DigitalPrinting" DeviceName="Dev E">
2     <DevCaps Name="RunList" LinkUsage="Input" TypeIndex="0"/>
3     <DevCaps Name="DigitalPrintingParams" LinkUsage="Input" TypeIndex="0">
4       <IntegerState Name="DensityAdjustment" AllowedValueList="-8 ~ 7" Description="Density Adjustment"/>
5       <IntegerState Name="NumberOfCopies" AllowedValueList="1 ~ 10000" Description="Number of Copies"/
6       <EnumerationState Name="Sides"
              AllowedValueList="OneSidedFront OneSidedBack TwoSidedFlipX TwoSidedFlipY"
              Description="Two Sided Designation"/>
7     </DevCaps>
8     <DevCaps Name="Media" LinkUsage="Input" TypeIndex="0">
9       <EnumerationState Name="Type" AllowedValueList="Plain Coated1 Coated2 Coated3 Transparency"
              Description="Paper Type"/>
10      <EnumerationState Name="Size" AllowedValueList="A3 A4 Letter Legal Ledger"
              Description="Paper Size"/>
11    </DevCaps>
12    <DevCaps Name="Component" LinkUsage="Output" TypeIndex="0"/>
13  </DeviceCap>
```

FIG. 22

```
1   <DeviceCap CombinedMethod="Combined" Types="Stitching" DeviceName="Dev E">
2     <DevCaps Name="Component" LinkUsage="Input" TypeIndex="0"/>
3     <DevCaps Name="StitchingParams" LinkUsage="Input" TypeIndex="0">
4       <BooleanState Name="NoOp" AllowedValueList="true false" Description="Staple"
             ValueDesc="OFF ON"/>
5       <EnumerationState Name="StitchPosition"
             AllowedValueList="UpperLeftCorder UpperRightCorner LeftSide UpperSide RightSide"
             Description="Position" ValueDesc="Upper Left Upper Right Left Up Right"/>
6     </DevCaps>
7     <DevCaps Name="Component" LinkUsage="Output" TypeIndex="0"/>
8   </DeviceCap>
```

FIG. 23

```
1   <DeviceCap CombinedMethod="Combined" Types="HoleMaking" DeviceName="Dev E">
2     <DevCaps Name="Component" LinkUsage="Input" TypeIndex="0"/>
3     <DevCaps Name="HoleMakingParams" LinkUsage="Input" TypeIndex="0">
4       <BooleanState Name="NoOp" AllowedValueList="true false" Description="Punch"
             ValueDesc="OFF ON"/>
5       <EnumerationState Name="PunchPosition" AllowedValueList="LeftSide UpperSide RightSide"
             Description="Position" ValueDesc="Left Up Right"/>
6     </DevCaps>
7     <DevCaps Name="Component" LinkUsage="Output" TypeIndex="0"/>
8   </DeviceCap>
```

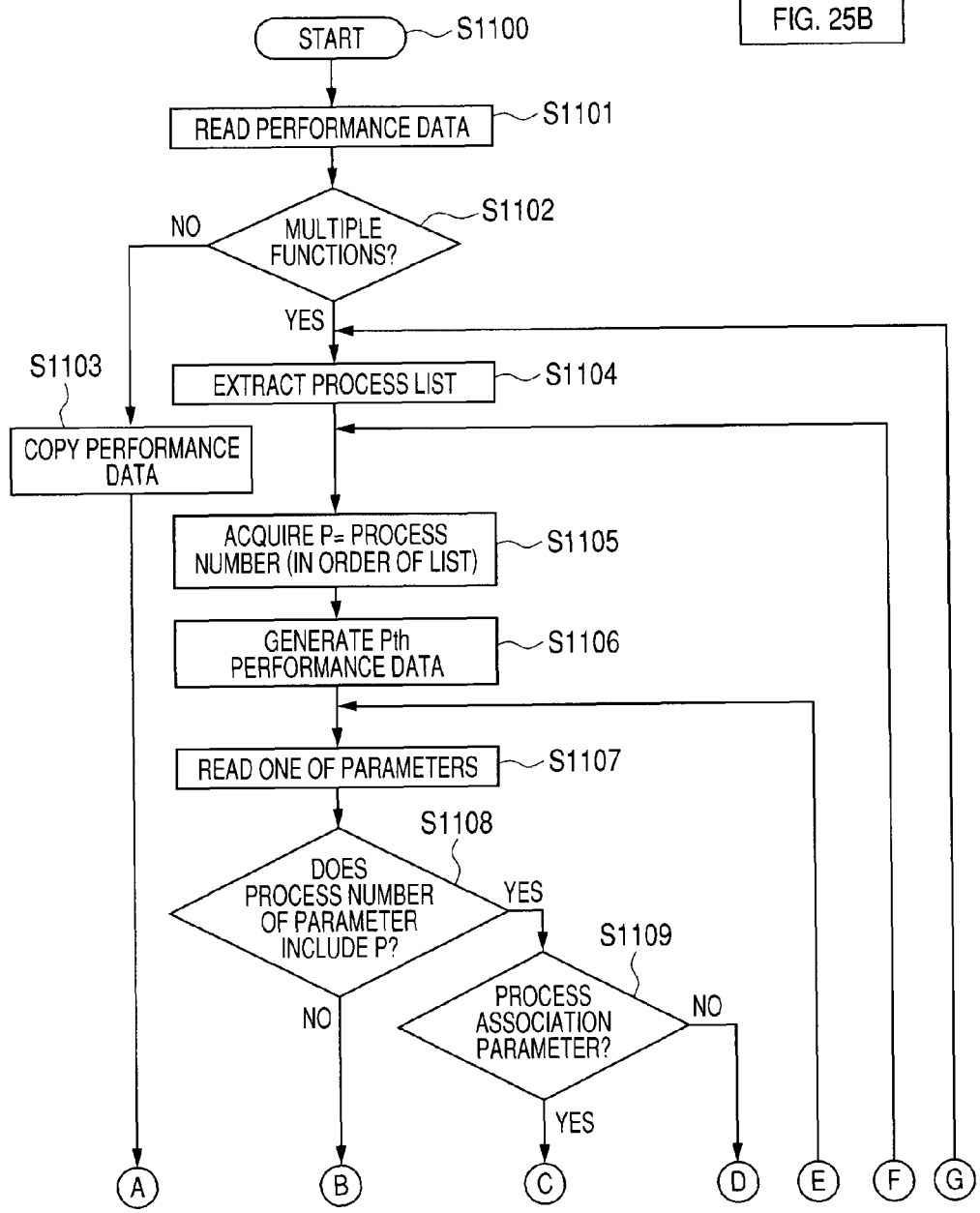

FIG. 27

```
1   <DeviceCap CombinedMethod="Combined" Types="DigitalPrinting Stitching HoleMaking"
        DeviceName="Dev E">
2     <ValidCombination>
3       <Combination Types="DigitalPrinting"/>
4       <Combination Types="DigitalPrinting Stitching"/>
5       <Combination Types="DigitalPrinting HoleMaking"/>
6       <Combination Types="DigitalPrinting Stitching HoleMaking"/>
7     </ValidCombination>
8     <DevCaps Name="RunList" LinkUsage="Input" TypeIndex="0"/>
9     <DevCaps Name="DigitalPrintingParams" LinkUsage="Input" TypeIndex="0">
10      <IntegerState Name="DensityAdjustment" AllowedValueList="-8 ~ 7" Description="Density Adjustment"/>
11      <IntegerState Name="NumberOfCopies" AllowedValueList="1 ~ 10000" Description="Number of Copies"/
12      <EnumerationState Name="Sides"
            AllowedValueList="OneSidedFront OneSidedBack TwoSidedFlipX TwoSidedFlipY"
            Description="Two Sided Designation"/>
13    </DevCaps>
14    <DevCaps Name="Media" LinkUsage="Input" TypeIndex="0">
15      <EnumerationState Name="Type" AllowedValueList="Plain Coated1 Coated2 Coated3 Transparency"
            Description="Paper Type"/>
16      <EnumerationState Name="Size" AllowedValueList="A3 A4 Letter Legal Ledger"
            Description="Paper Size"/>
17    </DevCaps>
18    <DevCaps Name="Component" TypeIndex="0 1"/>
19    <DevCaps Name="StitchingParams" LinkUsage="Input" TypeIndex="1">
20      <BooleanState Name="NoOp" AllowedValueList="true false" Description="Staple"
            ValueDesc="OFF ON"/>
21      <EnumerationState Name="StitchPosition"
            AllowedValueList="UpperLeftCorder UpperRightCorner LeftSide UpperSide RightSide"
            Description="Position" ValueDesc="Upper Left Upper Right Left Up Right"/>
22    </DevCaps>
23    <DevCaps Name="Component" TypeIndex="1 2"/>
24    <DevCaps Name="HoleMakingParams" LinkUsage="Input" TypeIndex="2">
25      <BooleanState Name="NoOp" AllowedValueList="true false" Description="Punch"
            ValueDesc="OFF ON"/>
26      <EnumerationState Name="PunchPosition" AllowedValueList="LeftSide UpperSide RightSide"
            Description="Position" ValueDesc="Left Up Right"/>
27    </DevCaps>
28    <DevCaps Name="Component" LinkUsage="Output" TypeIndex="2"/>
29  </DeviceCap>
```

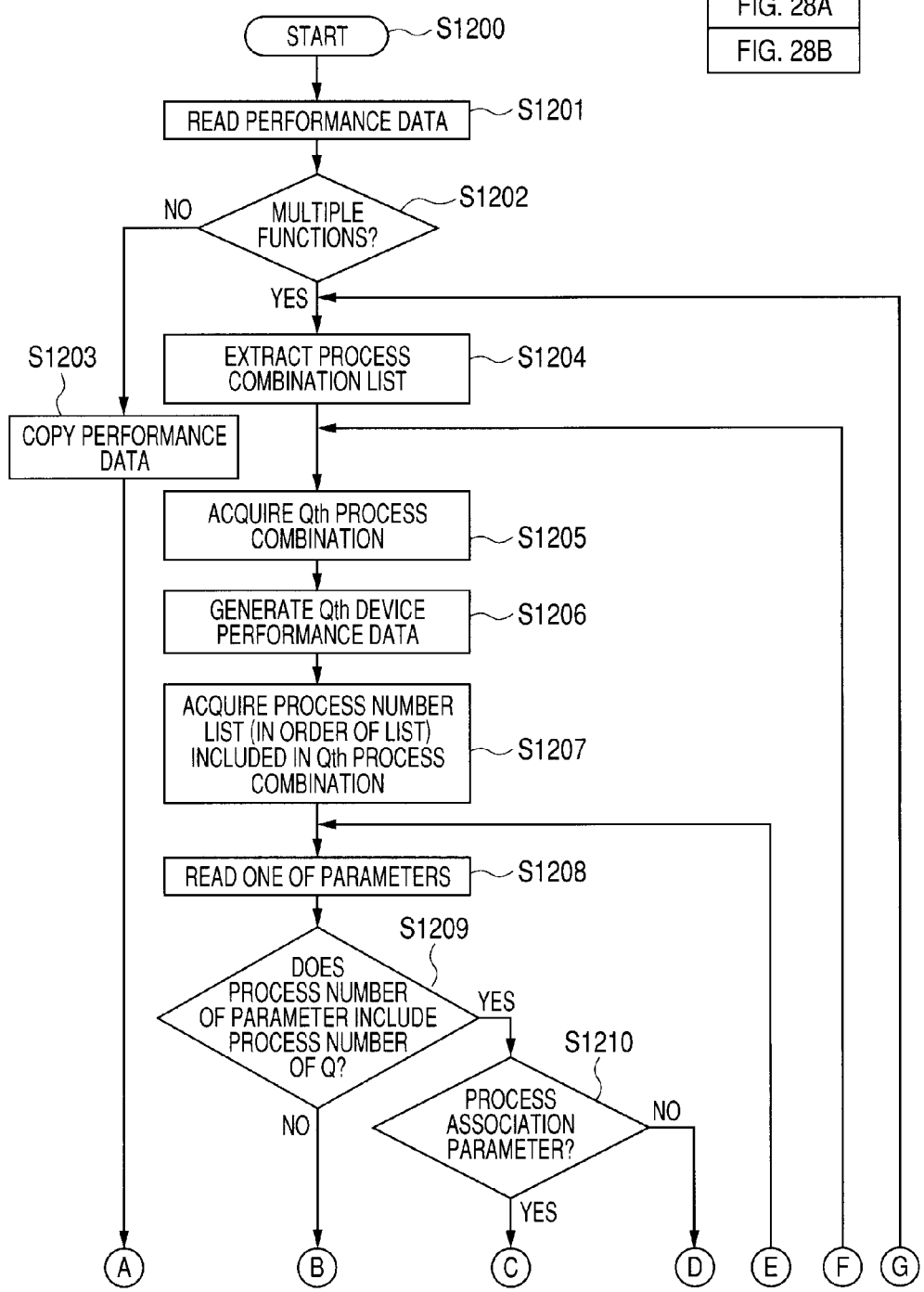

INFORMATION PROCESSING APPARATUS, INFORMATION PROCESSING METHOD, AND STORAGE MEDIUM

BACKGROUND OF THE INVENTION

1. Field of the Invention

The present invention relates to an information processing apparatus, an information processing method, and a program.

2. Description of the Related Art

In the commercial printing industry, movements toward high-value-added small lot job orders and reduction in the delivery data are active. Therefore, in addition to conventionally used offset printers and post-processing machines, print-on-demand (hereinafter, "POD") machines are actively implemented.

Furthermore, workflow systems for controlling procedures and processes of systems and devices required for printing and binding are used in the commercial printing industry. The workflow systems have plug-in configurations so that various systems and devices can be combined.

The user can operate a workflow system to define a print workflow for using systems and devices connected to the workflow system. The user can also set details for processes of the defined workflow. The detail settings are converted to job tickets as instructions for systems and devices corresponding to the processes and transmitted to the systems and devices.

One of the technical backgrounds that make such a configuration possible includes that the job ticket (JDF with standardized specifications) for controlling the devices and systems is in a format that expresses a workflow.

In the JDF job ticket, the description part corresponding to the processes constituting the workflow is divided into process-by-process pieces, and each can describe independent parameters. The entire print workflow can be expressed by describing a plurality of processes in the JDF job ticket.

A digital printer such as an MFP includes a plurality of functions within one device. For example, if an in-line finisher of stapling is mounted on, the digital printer includes a printing function and a stapling function.

In such a case, one process includes a plurality of functions, and the same descriptions are written in the JDF job tickets.

The workflow system that generates the JDF job ticket obtains the process type and configurable parameters of the devices and systems in a JDF format for each plug-in, the process type and the parameters serving as performance data. This allows the workflow system to display a user interface screen for inputting configuration parameters. Based on the user interface screen and the performance data, the JDF that can be generated can be recognized in the workflow system, and an expansion for creating an arbitrary workflow is possible regardless of the type of process.

While the workflow system includes such a scalability, setting of control parameters suitable for the processes in the workflow system is complicated, and an enhanced skill is required. Therefore, there is a technique that can easily set control parameters suitable for the processes of the workflow system for reproduction process.

A technique in Japanese Patent Application Laid-Open No. 2003-276150 displays a workflow for the reproduction process of a specific printed material on an assisted setting screen and displays a menu and a field for allowing the user to input a keyword related to the workflow. When the user sets a keyword, control parameters suitable for a plurality of processes of the workflow are determined accordingly.

If a POD machine that includes a plurality of functions (such as printing, stapling, and punching) is incorporated into a workflow system used in conventional offset printing, and a workflow is created in combination with a near-line finisher, the same functions overlap.

If both overlapping functions are effective, an abnormal workflow is formed. Therefore, there is a problem that a user's intended printed material cannot be made.

In Japanese Patent Application Laid-Open No. 2003-276150 described above, appropriate parameters are set according to the input of keyword by the user. Therefore, the implementation depends on the contents of processes constituting the workflow.

However, a POD machine can be easily connected to the workflow system because of the flexible scalability.

The present invention has been made in view of the foregoing problem, and an object of the present invention is to provide the user with a creating unit that can easily create a normal workflow without impairing the scalability included in an existing workflow system.

SUMMARY OF THE INVENTION

To solve the problem, the present invention provides an information processing apparatus that lays out a plurality of drawing data included in a document on a page, the information processing apparatus including: an arrangement determining unit that determines whether the drawing data can be arranged in a margin area of another page; and a color output determining unit that determines whether a color output result of the drawing data changes as the drawing data is arranged on the another page if the arrangement determining unit determines that the drawing data can be arranged in a margin area of another page, wherein the arrangement determining unit determines not to arrange the drawing data on the another page if the color output result changes and the arrangement determining unit determines to arrange the drawing data on the another page if the color output result does not change.

Further features of the present invention will become apparent from the following description of exemplary embodiments with reference to the attached drawings.

BRIEF DESCRIPTION OF THE DRAWINGS

FIG. 11 is an example of a job ticket generated by a job ticket generating unit 26 (part 1).

FIG. 12 is a job ticket after the job ticket of FIG. 11 is distributed (part 1).

FIG. 13 is a job ticket after the job ticket of FIG. 11 is distributed (part 2).

FIG. 14 is a job ticket after the job ticket of FIG. 11 is distributed (part 3).

FIG. 15 is an example of a job ticket generated by the job ticket generating unit 26 (part 2).

FIG. 16 is a job ticket after the job ticket of FIG. 15 is distributed (part 1).

FIG. 17 is a job ticket after the job ticket of FIG. 15 is distributed (part 2).

FIG. 18 is an example of performance data obtained by a performance obtaining unit 18 or a performance obtaining unit 20 (part 1).

FIG. 19 is an example of performance data acquired by the performance obtaining unit 18 or the performance obtaining unit 20 (part 2).

FIG. 20 is an example of performance data acquired by the performance obtaining unit 18 or the performance obtaining unit 20 (part 3).

FIG. 21 is an example of performance data processed by the workflow system (part 1).

FIG. 22 is an example of performance data processed by the workflow system (part 2).

FIG. 23 is an example of performance data processed by the workflow system (part 3).

FIG. 27 is an example of performance data obtained by the performance obtaining unit 18 or the performance obtaining unit 20 (part 4).

DESCRIPTION OF THE EMBODIMENTS

Embodiments of the present invention will now be described based on the drawings.

First Embodiment

Configuration of Entire Printing and Binding System

Figure 1:
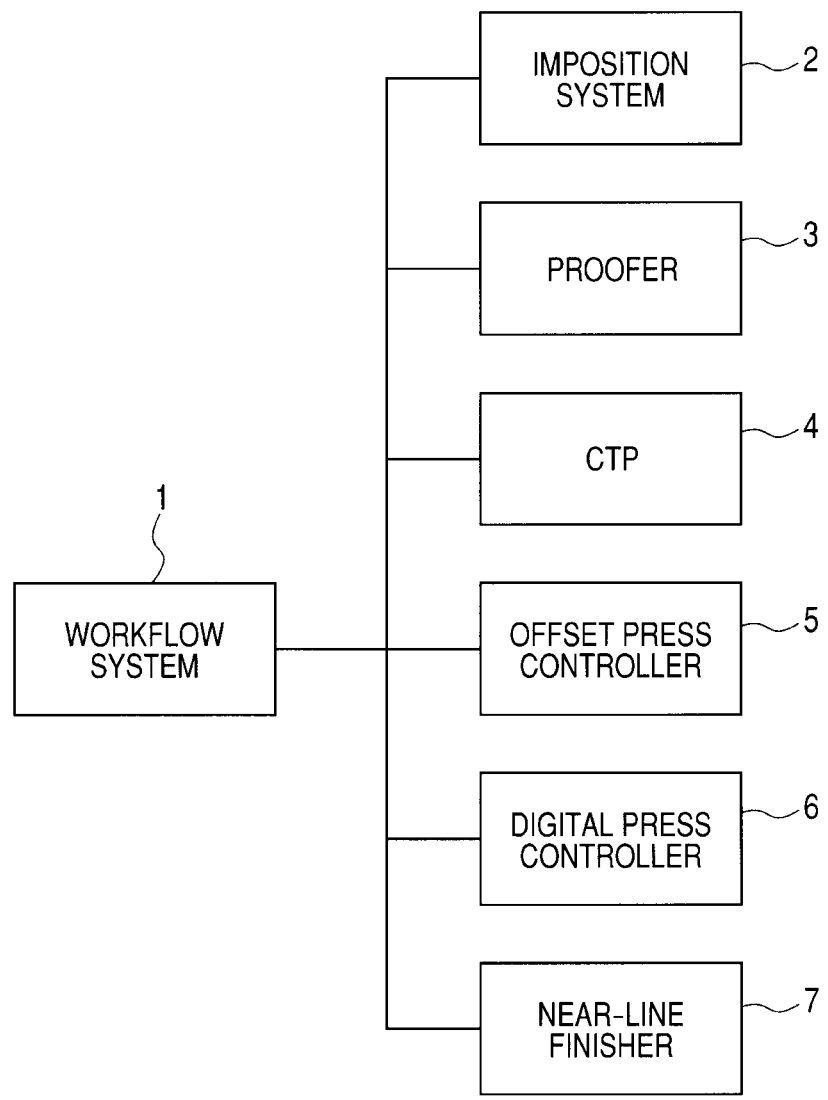
FIG. 1 is an example of the entire printing and binding system including a workflow system, a connection system, and a connection device.

FIG. 1 is an example of the entire printing and binding system including a workflow system, a connection system, and a connection device.

A workflow system 1 is connected to an imposition system 2, a proofer 3, a CTP (Computer To Plate) 4, an offset press controller 5, a digital press controller 6, and a near-line finisher 7. The offset press controller 5 controls an offset printer. The workflow system 1 creates and edits a workflow of printing and binding constituted by combining the system and devices 2 to 7, and controls the execution of the created workflow.

As shown in FIG. 1, the workflow system 1 can constitute a mixed workflow with a combination of a print system and a POD machine that create a conventional plate.

The systems and the devices connected to the workflow system 1 are also called apparatuses.

(Functional Configuration of Entire Workflow System)

Figure 2:
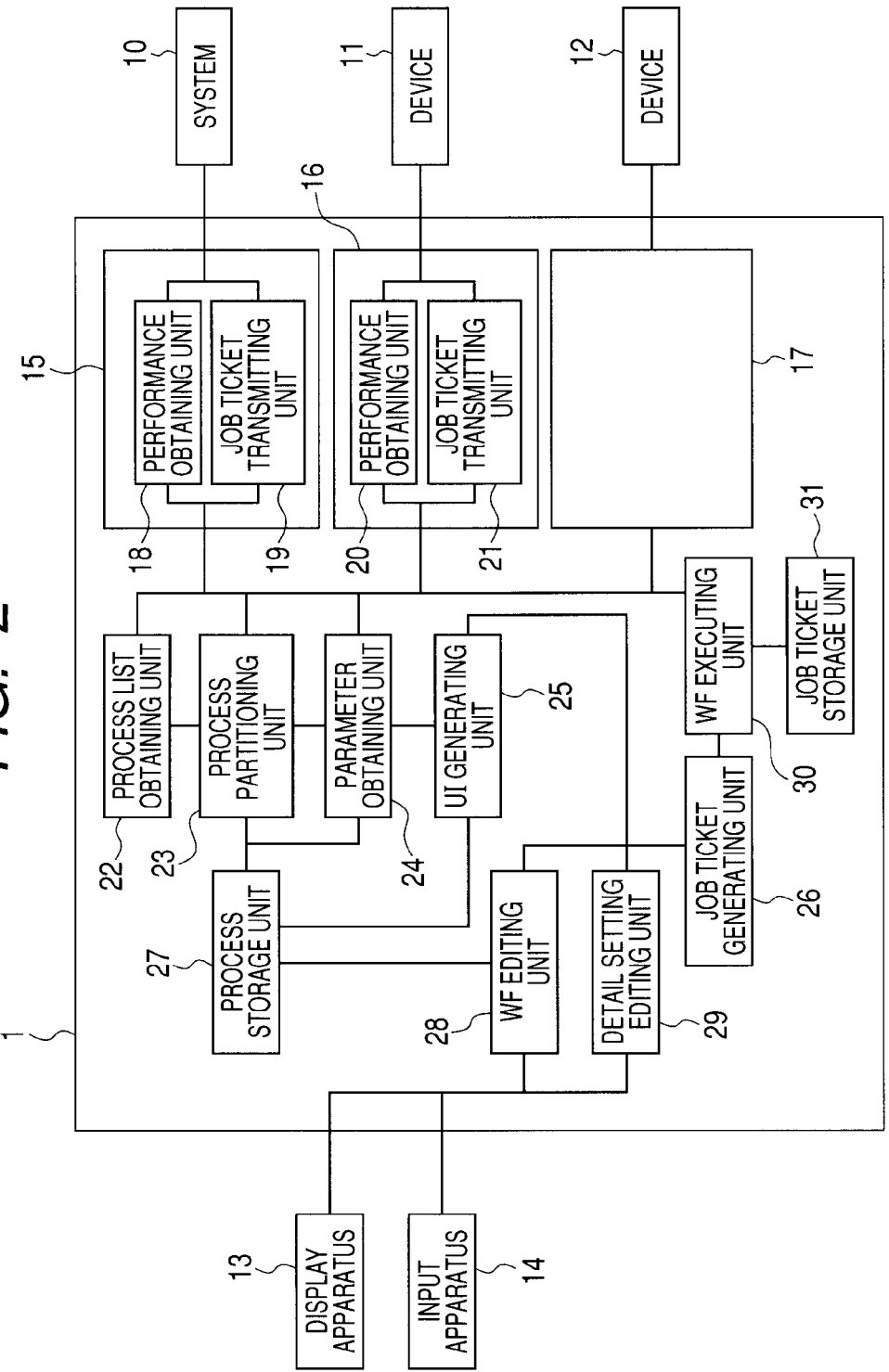
FIG. 2 is an example of a functional configuration of the workflow system.

FIG. 2 is an example of a functional configuration of the workflow system.

In FIG. 2, a system 10 is connected to the workflow system. A device 11 is connected to the workflow system. Another device 12 is connected to the workflow system. A display apparatus 13 is used by the user to operate the workflow system 1 or used by the workflow system 1 to display a screen. An input apparatus 14 is used by the user to operate the workflow system 1.

A connection 15 connects the system 10 to the workflow system 1. A connection 16 connects the device 11. A connection 17 connects the device 12. A performance obtaining unit 18 operates in the connection 15. A job ticket transmitting unit 19 operates in the connection 15. A performance obtaining unit 20 operates in the connection 16. A job ticket transmitting unit 21 operates in the connection 16.

The workflow system 1 includes a process list obtaining unit 22, a process partitioning unit 23, a parameter obtaining unit 24, a UI generating unit 25, a job ticket generating unit 26, a process storage unit 27, a workflow editing unit (WF editing unit) 28, a detail setting editing unit 29, a workflow executing unit (WF executing unit) 30, and a job ticket (JobTicket) storage unit 31.

Figure 26:
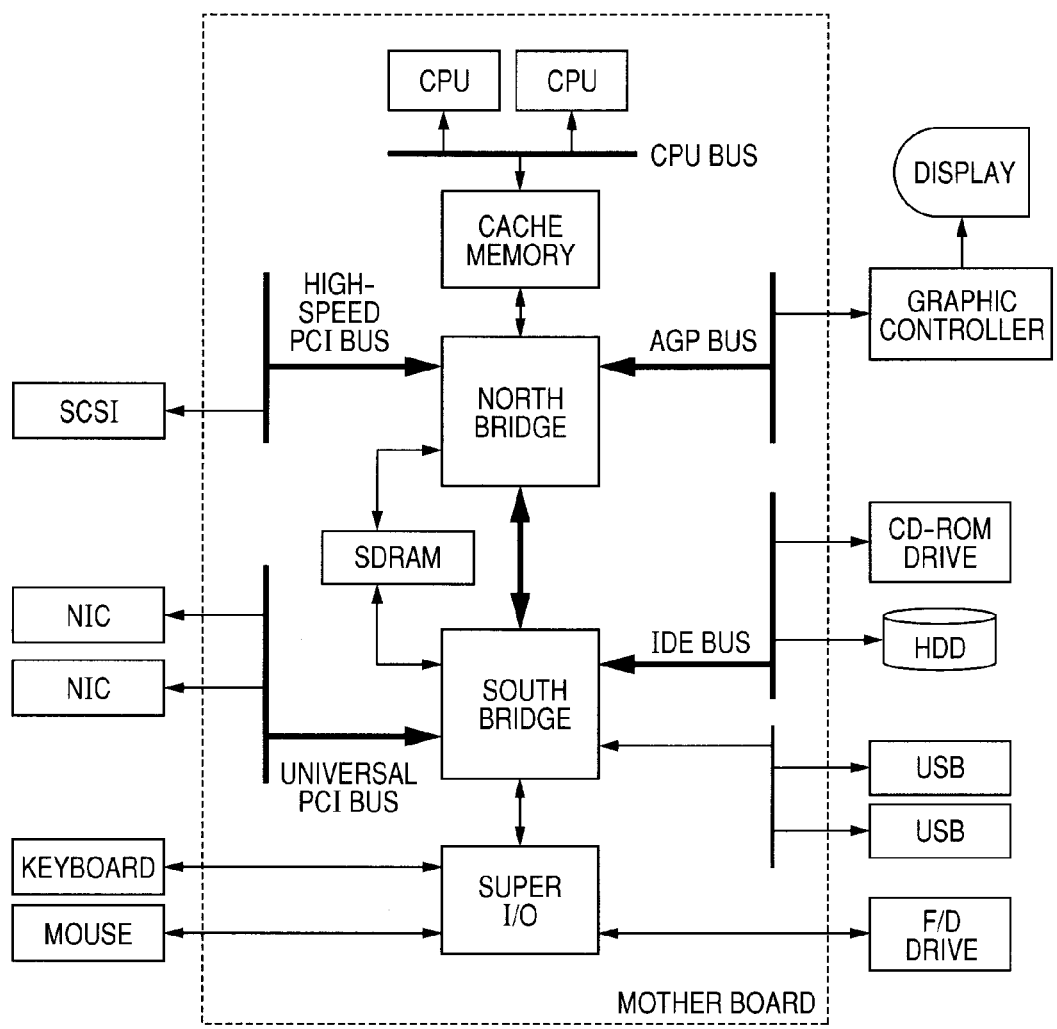
FIG. 26 is an example of a hardware configuration of the workflow system.

The display apparatus 13 corresponds to a display of FIG. 26 described below. The input apparatus 14 corresponds to a keyboard and a mouse of FIG. 26 described below.

The system and devices 10, 11, and 12 correspond to various system and devices 2 to 7 in FIG. 1. The number of connected devices is arbitrary. The system and devices are connected to the workflow system 1 through corresponding connections. In FIG. 2, all connections include a performance obtaining unit and a job ticket transmitting unit.

Once the system 10 is connected to the workflow system 1, the performance obtaining unit 18 obtains performance data of the system 10. Based on the performance data, the workflow system 1 can recognize information such as what kind of job ticket should be described for the system 10, or what values can be written in the job ticket.

The process list obtaining unit 22 analyzes the obtained performance data of the system 10 to obtain a list (list information) of processes that can be executed on the system 10 (obtain list information). If the system 10 includes one function, only one process can be obtained in the process list. If the system 10 includes a plurality of functions, the process list obtaining unit 22 can obtain a process list corresponding to the plurality of functions.

The process partitioning unit 23 partitions (divides) the performance data of the system 10 into individual processes listed on the obtained process list (information division). In this case, the parameter obtaining unit 24 obtains configuration parameters of job tickets corresponding to the individual processes from the performance data of the system 10. The process storage unit 27 then associates the information of the processes and the information of the corresponding configuration parameters to form performance data and stores the performance data in an HDD or a cache memory of FIG. 26.

Meanwhile, the UI generating unit 25 generates a UI screen (workflow edit screen) based on the performance data stored by the process storage unit 27.

The user creates, edits, and executes definition information of the workflow through the UI screen displayed on the display apparatus 13. In this case, the workflow editing unit 28 follows the user operation through the UI screen and uses the performance data stored by the process storage unit 27 in the HDD or the cache memory to create, edit, and execute the definition information of the workflow of printing and binding. The detail setting editing unit 29 follows the user operation through the UI screen to set (or change) details (values) of the parameters corresponding to the processes of the workflow edited by the workflow editing unit 28.

The job ticket generating unit 26 creates a job ticket based on the definition information of the workflow and the detail setting of the parameters. The generated job ticket is read by the workflow executing unit 30 and used for controlling the systems and devices used in the workflow. The workflow executing unit 30 temporarily stores the job ticket in the HDD or the cache memory through the job ticket storage unit 31. The workflow executing unit 30 transmits the job ticket through the job ticket transmitting unit in the connection of each of the systems and devices to execute the workflow based on the job ticket.

(Example of UI of Workflow System)

Figure 3:
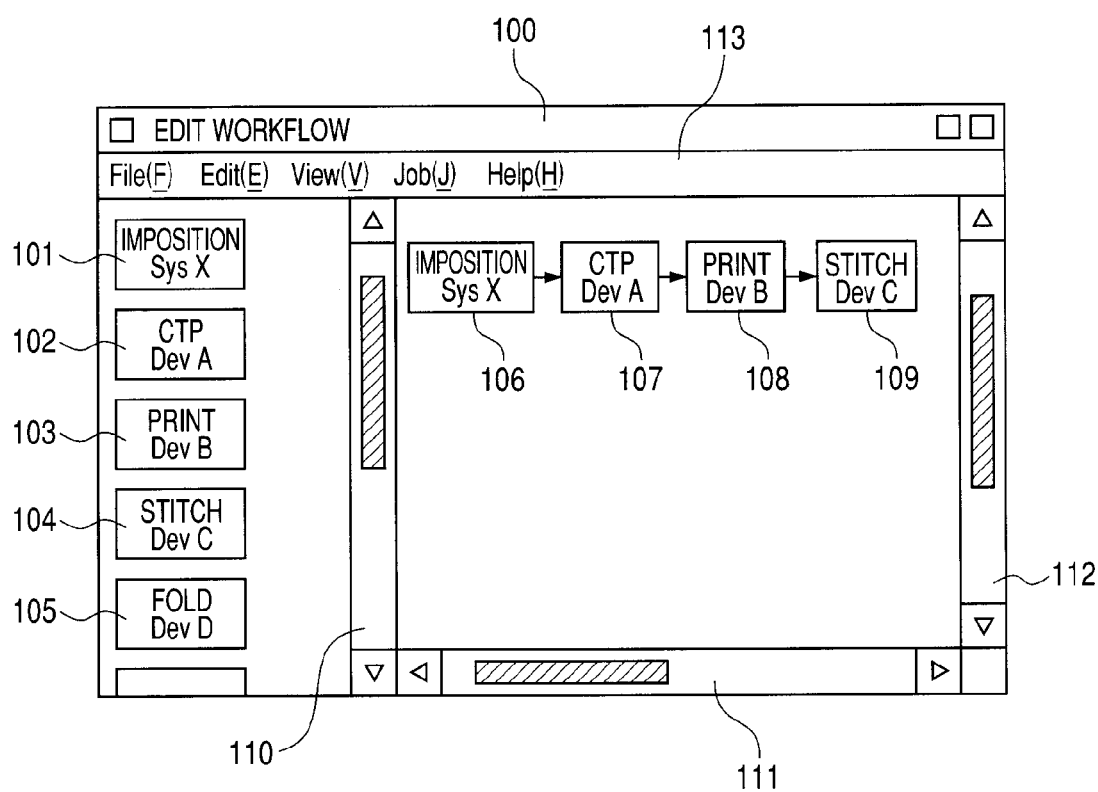
FIG. 3 is an example of a workflow edit screen (part 1).

FIG. 3 is an example of a workflow edit screen (part 1).

FIG. 3 is displayed on the display apparatus 13 and is operated by use of the input apparatus 14.

FIG. 3 illustrates the entire workflow edit screen 100 and a menu operation unit 113. An area on the left side of the workflow edit screen 100 is an area indicating possible selections of processes constituting the workflow. Icons (objects) indicating processes 101 to 105 are displayed in FIG. 3. Icons indicating processes for creating and editing the workflow are arranged in an area on the right side. Icons 106 to 109 are arranged in FIG. 3. A scroll bar 110 vertically moves the display area on the left side. A scroll bar 111 horizontally moves the display area on the right side. A scroll bar 112 vertically moves the display area on the right side.

In the area on the left side, the icon 101 indicates an imposition process of a system "Sys X". The icon 102 indicates a CTP device "Dev A". The icon 103 indicates a printing process of a device "Dev B". The icon 104 indicates a stitching process of a device "Dev C". The icon 105 indicates a folding process of a device "Dev D".

In the area on the right side, the icon 106 denotes a process (icon indicating the process) in the workflow arranged after the user has selected the icon 101 in the area on the left. In the workflow system 1 of the present embodiment, the user uses a pointing device, etc., to click and drag the icon to arrange the icon at an arbitrary position. The icons 107 to 109 are also arranged in the same way, and the user can connect the processes by a link (arrow) to designate the association of these four processes.

In the example of screen illustrated in FIG. 3, "Sys X" executes an imposition process and transmits the data to the CTP of "Dev A" to create a plate (block). The "Dev B" further executes a printing process using the plate, and lastly, "Dev C" executes a stitching process. The workflow is defined this way.

Other than the parts that can be seen in FIG. 3, selectable processes are also listed in the area on the left side of FIG. 3.

The user can input the arrangement of processes and the association between the processes on the screen illustrated in FIG. 3 to define the workflow (create the definition information of the workflow).

An operation of detail setting of the processes in the defined workflow will be described.

Figure 4:
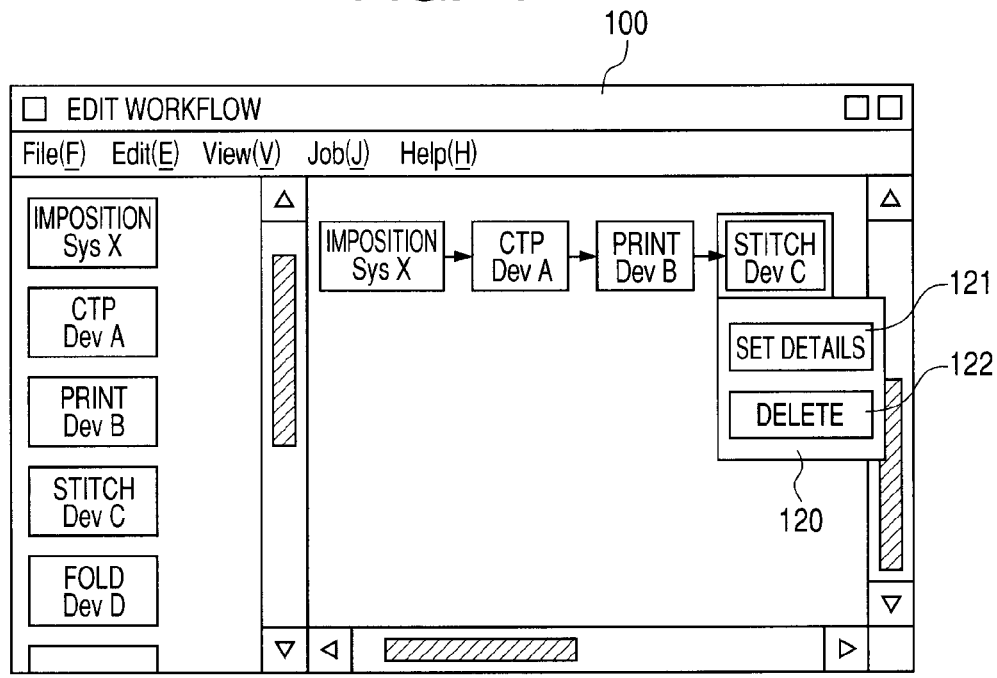
FIG. 4 is an example of a state in which the user has selected a stitching process (Stitch) 109 from the state of FIG. 3.

FIG. 4 is an example of a state in which the user has selected the stitching process (Stitch) 109 from the state of FIG. 3.

In the present embodiment, the user selects the processes of the workflow arranged in the area on the right side to display the processing menu to edit the processes.

In FIG. 4, an edit operation menu 120 is displayed when the stitching process 109 is selected. A menu button 121 indicates a detail setting function in the menu 120. A menu button 122 indicates a process deleting function in the menu 120.

The detail setting of the stitching process 109 can be edited by selecting the detail setting menu button 121 illustrated in FIG. 4.

The stitching process 109 can be deleted by selecting the menu button 122.

Figure 5:
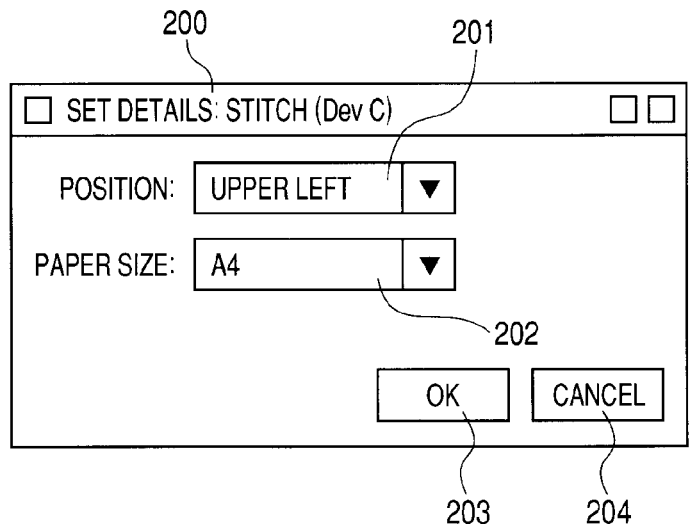
FIG. 5 is an example of a detail setting screen of a stitching process displayed as the user selects a detail setting menu button 121 in FIG. 4.

FIG. 5 is an example of a detail setting screen of the stitching process displayed as the user selects the detail setting menu button 121 in FIG. 4.

FIG. 5 illustrates the entire detail setting 200 of the stitching process in the device "Dev C".

A selection area 201 denotes a stitch position. The user can select a stitch position from a plurality of selections. A selection area 202 denotes the paper size. The user can select a paper size from a plurality of selections.

An OK button 203 confirms the setting. A CANCEL button 204 abandons the inputs of detail setting. The user presses the OK button 203 to reflect the detail setting of the stitching process 109.

The user sets details of other processes in the same way as the detail setting of the stitching process 109 on the screen illustrated in FIG. 5 to perform the entire setting of the created workflow (set details of parameters).

A screen for executing a printing and binding job according to the created workflow and the setting will be described.

Figure 6:
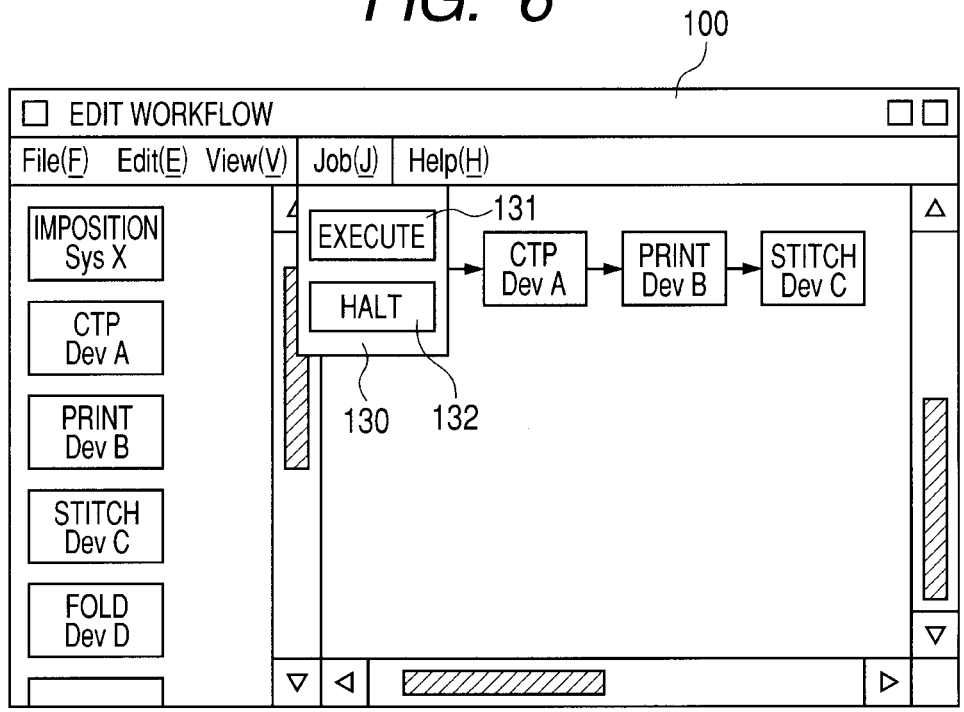
FIG. 6 is an example of an operation screen for instructing the execution of a job.

FIG. 6 is an example of an operation screen for instructing the execution of a job. FIG. 6 corresponds to the example of workflow described in FIGS. 3 to 5 and illustrates an example of a screen for executing a printing and binding job according to the created workflow.

FIG. 6 illustrates a state in which the user has selected a "Job" menu in the menu 113 to open a menu screen 130. A menu button 131 is for the execution of the job in the job menu 130, and a menu button 132 is for halting the job.

The user can select the menu button 131 to instruct the execution of the job according to the created workflow and the detail setting. The user can select the menu button 132 to instruct halting the job in execution.

FIG. 3 illustrates an example of editing the workflow combined with a device and systems, each including a single function. An example of a screen, in which devices and a system with a plurality of functions are used, will be illustrated.

Figure 7:
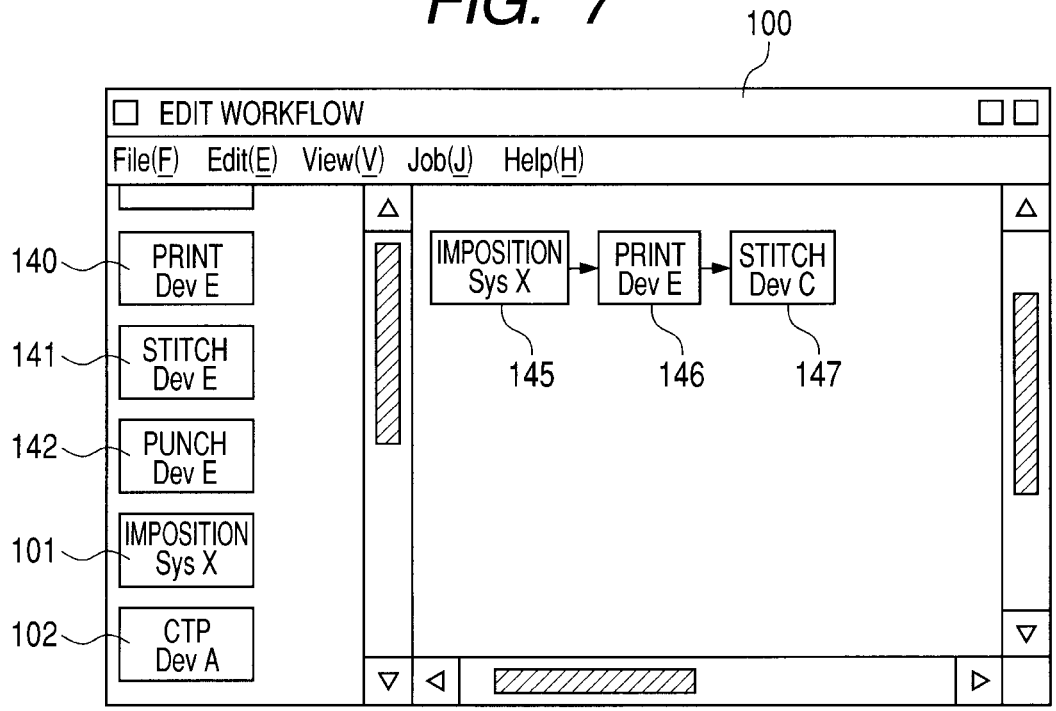
FIG. 7 is an example of a workflow edit screen (part 2).

FIG. 7 is an example of a workflow edit screen (part 2). FIG. 7 displays possible selections of processes different from those in FIG. 3. The same parts as in FIG. 3 are designated with the same reference numerals in FIG. 7.

An icon 140 indicates a printing process of a device "Dev E". An icon 141 indicates a stitching process of the device "Dev E". An icon 142 indicates a punching process of the device "Dev E". As illustrated in FIG. 7, the device "Dev E" includes stitching and punching functions in addition to the printing function.

If a device, such as the device "Dev E", includes a plurality of functions, the workflow system 1 handles the individual functions as independent processes. The workflow system 1 combines the independent processes to generate a workflow. The area on the right side of FIG. 7 displays an example of a workflow in which individual functions of one device are independently combined. Icons 145 to 147 illustrate a process in which the user has selected and arranged the icons 101, 140, and 104 on the えft side. The workflow system 1 combines the processes to use only the print function of the device "Dev E" to create a workflow combined with other systems and devices. In the example of FIG. 7, the user selects the stitching function of the device "Dev C", not the stitching function of the device "Dev E". In this way, the present specification can control the display so that a plurality of functions included in a device can be selected after being sorted into individual functions.

Figure 8:
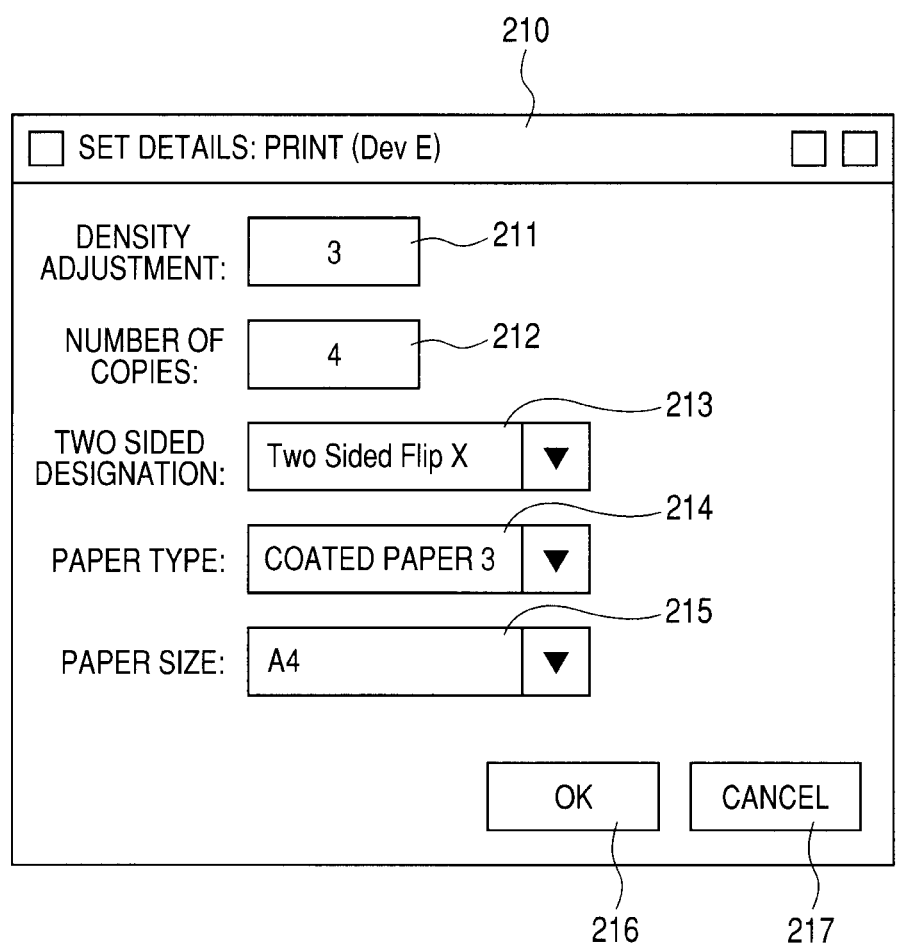
FIG. 8 is an example of a detail setting screen displayed as the user selects a process 146 in FIG. 7.

FIG. 8 is an example of a detail setting screen displayed as the user selects the process 146 in FIG. 7.

FIG. 8 illustrates a detail setting screen 210 of a printing process in the device "Dev E". Only the details related to the printing process among the detail settings of the functions of the device "Dev E" can be set in the detail setting screen 210.

In FIG. 8, an input area 211 is an area for inputting a density adjustment value.

An input area 212 is an area for inputting the number of output copies.

A selection area 213 is an area for selecting two sided printing. In the example of FIG. 8, a designation for two sided printing called "Two Sided Flip X" is selected, in which the paper is flipped along the X axis.

A selection area 214 is an area for selecting the paper type to be used.

A selection area 215 is an area for selecting the paper size to be used.

Still another example of workflow will be illustrated.

Figure 9:
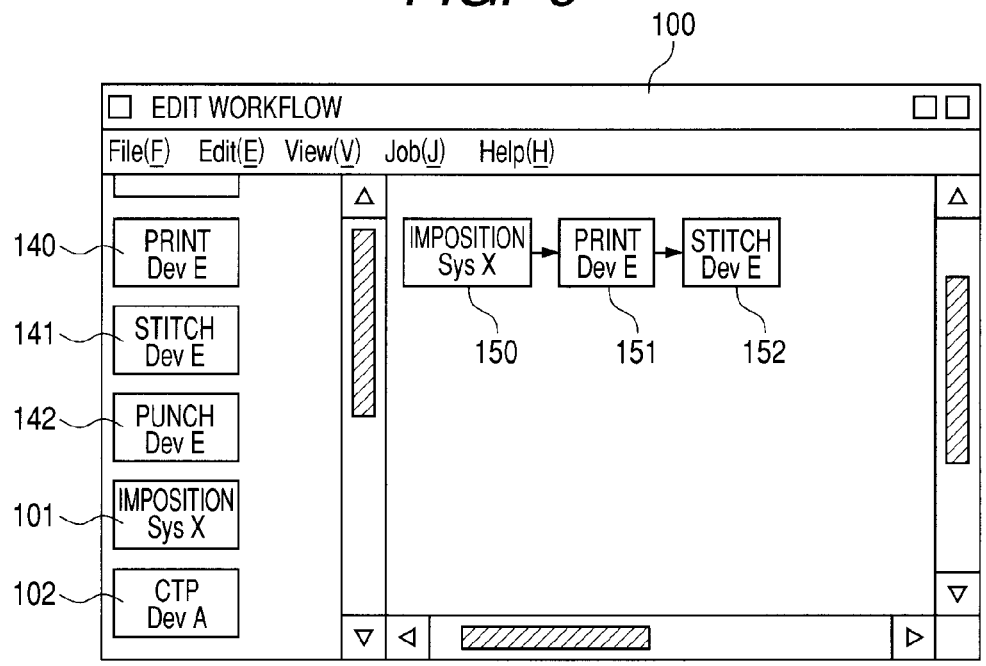
FIG. 9 is an example of a workflow edit screen (part 3).

FIG. 9 is an example of a workflow edit screen (part 3). While FIG. 7 uses the stitching process of the device "Dev C", FIG. 9 uses the stitching process of the device "Dev E". Thus, the "Dev E" executes the printing and stitching process. In the present embodiment, the workflow system 1 combines and displays individual functions on the workflow to use a plurality of functions within the same device. As a result, which function in the device is used is clear during the creation of the workflow.

Icons 150 to 152 illustrate the result of an arrangement of the icons 101, 140, and 141.

Figure 10:
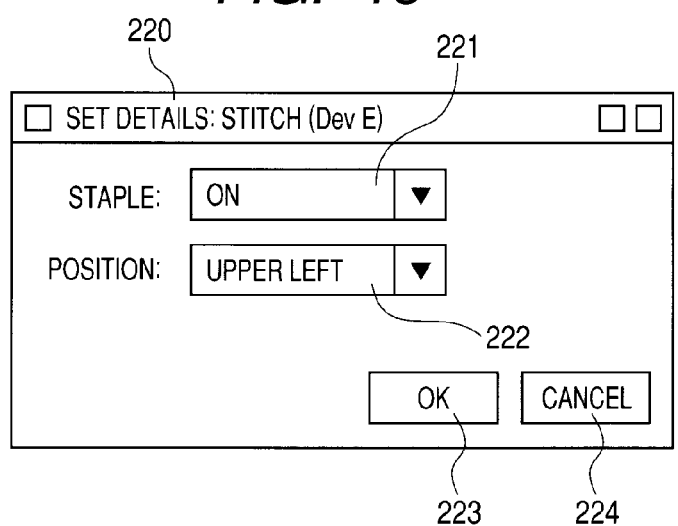
FIG. 10 is an example of a detail setting screen displayed as the user selects a process 152 in FIG. 9.

FIG. 10 is an example of a detail setting screen displayed as the user selects the process 152 in FIG. 9.

In a detail setting screen 220 of FIG. 10, details related to the stitching process among the detail settings of the functions of the device "Dev E" can be set.

In FIG. 10, a selection area 221 is an area for selecting on/off of the stitching function.

A selection area 222 is an area for selecting the stitch position.

The workflow edited this way is stored in the workflow system 1 in a form of a job ticket. To execute a job, the systems and devices execute the processes according to the job ticket.

The content of the job ticket will be described.

(Description of Job Ticket)

FIG. 11 is an example of a job ticket generated by the job ticket generating unit 26 (part 1).

The job ticket illustrated in FIG. 11 denotes the workflow illustrated in FIG. 7.

The data format in the present embodiment is in a form of text document using a markup language represented by SGML and XML. However, simplified expressions of only the parts necessary to describe the present embodiment are used, and the specifications of SGML and XML are not strictly followed.

In FIG. 11, <JDF> in the first line denotes the start of data description. An expression corresponding to this is </JDF> in the 42nd line, which denotes the end of data description. Similarly, descriptions corresponding to a keyword are written in a plurality of lines between the line of the keyword between "<" and ">" and the line of the same keyword between "</" and ">". These are called JDF tags. The format has a nested configuration, and three JDF tags further exist in the first JDF tag illustrated in FIG. 11.

The first is the second to ninth lines. The second is the tenth to 18th lines. The third is the 19th to 27th lines. These three JDF tags correspond to the processes constituting the workflow. More specifically, the second to ninth lines correspond to the process 145 of FIG. 7. The tenth to 18th lines correspond to the process 146, and the 19th to 27th lines correspond to the process 147.

Furthermore, a ResourcePool tag exists in the 28th to 41st lines.

The ResourcePool tag includes the content of individual detail settings (values of configuration parameters). The detail settings are referenced by IDs from the JDF tag and associated. An example of description corresponding to the process 145 will be described.

The description of "Type="LayoutPreparation"" in the second line indicates that the process 145 is an imposition process. The description of "ID="id001"" indicates that the identifier of the imposition process corresponding to the process 145 is "id001".

A ResourceLinkPool tag exists in the third to eighth lines. The tag indicates that association information of detail setting is included.

The fourth line indicates a first piece of association information in the process of id001. The tag "DeviceLink" in the fourth line indicates an association to the information called Device. The description of "rRef="d001"" indicates that the association refers to Device information with ID "d001". The referenced position is the 29th line describing a Device tag with a description of "ID="d001"". Since the 29th line describes "name="Sys X"", it can be recognized that the process of id001 is executed by an instruction to the device "SysX".

The RunListLink tag in the fifth line is also an association to the information RunList. The description "rRef="r001"" refers to the 32nd line. The description "Usage="Input"" indicates that the detail setting information "RunList" is input information for the process of id001.

The sixth line is described in the same way as the fifth line.

There is a description "Usage="Output"" in the seventh line. The description indicates that RunList detail setting information of the seventh line is output information of the process of id001. In the seventh line, RunList refers to the description of the 34th line with ID r003. The 13th line in the process of id002 also refers to the 34th line. The description of the 13th line is "Usage="Input"". Thus, the process of id002 inputs RunList output by the process of id001. The description shows a relationship between the processes 145 and 146 illustrated in FIG. 7. The same applies to the relationship between the processes 146 and 147.

The relationship between the detail setting illustrated in FIG. 8 and the job ticket illustrated in FIG. 11 will be described.

The content input in the detail setting screen illustrated in FIG. 8 is reflected on the job ticket illustrated in FIG. 11.

The set content of the density adjustment 211 of FIG. 8 corresponds to the description of "DensityAdjustment="3"" in the 35th line of FIG. 11.

The set content of the number of copies 212 corresponds to "NumberOfCopies="4"" of the 35th line.

The set content of the two sided designation 213 corresponds to "Sides="TwoSidedFlipX"" of the 35th line.

The set content of the paper type 214 corresponds to "Type="Coated3"" of the 36th line.

The set content of the paper size 215 corresponds to "Size="A4"" of the 36th line.

Everything in the description of detail setting is referenced from the process of id002. For example, both the 36th line and the 39th line describe Media tags, and the ID of the 39th line is r022. The description is referenced from the process of id003.

In this way, the job ticket describes the detail setting information of the processes constituting the workflow.

When the job ticket generating unit 26 generates a job ticket as shown in FIG. 11, the job ticket is partitioned for devices and systems corresponding to the processes.

The job ticket for devices and systems will be described.

The workflow executing unit 30 distributes the job ticket illustrated in FIG. 11 to the devices and systems 10, 11, 12, etc., of FIG. 2.

FIGS. 12, 13, and 14 illustrate job tickets after the job ticket of FIG. 11 is distributed.

The job ticket illustrated in FIG. 12 corresponds to the first process (process 145 in FIG. 7) in the job ticket illustrated in FIG. 11. The job ticket describes an instruction of the content processed in the system "Sys X". The workflow executing unit 30 extracts the job ticket illustrated in FIG. 12 from the job ticket illustrated in FIG. 11 and transmits the job ticket to the system "Sys X".

A process of generating the job ticket of FIG. 12 from FIG. 11 will be described.

The second to ninth lines in FIG. 12 correspond to the second to ninth lines in FIG. 11. The workflow executing unit 30 copies the job ticket illustrated in FIG. 11 to the job ticket illustrated in FIG. 12.

The 11th line in FIG. 12 corresponds to the 29th line in FIG. 11. The workflow executing unit 30 copies the content corresponding to the description of a Device element with ID d001 referenced in the fourth line of FIG. 12 from the description of the job ticket illustrated in FIG. 11.

Similarly, the 12th line corresponds to the 32nd line. The 13th line corresponds to the 33rd line. The 14th line corresponds to the 34th line.

Descriptions of other parts in FIG. 12, such as ResourceLinkPool element and ResourcePool element, are the same as in the job ticket in FIG. 11.

The job ticket illustrated in FIG. 13 corresponds to the second process (process 146 in FIG. 7) in the job ticket illustrated in FIG. 11. The job ticket describes an instruction of the content processed in the device "Dev E". As in FIG. 12, the workflow executing unit 30 extracts the job ticket illustrated in FIG. 13 and transmits the job ticket to the device "Dev E".

The correspondence between the job tickets illustrated in FIGS. 11 and 13 is as follows.

The second to tenth lines in FIG. 13 correspond to the tenth to 18th lines in FIG. 11. As in the example of FIG. 12, the workflow executing unit 30 copies the job ticket illustrated in FIG. 11.

The 12th line in FIG. 13 corresponds to the 30th line in FIG. 11. The 13th line corresponds to the 34th line. The 14th line corresponds to the 35th line. The 15th line corresponds to the 36th line. The 16th line corresponds to the 37th line.

The job ticket illustrated in FIG. 14 corresponds to the third process (process 147 in FIG. 7) in the job ticket illustrated in FIG. 11. The job ticket describes an instruction of the content processed in the device "Dev C". As in FIG. 12, the workflow executing unit 30 extracts the job ticket illustrated in FIG. 14 and transmits the job ticket to the device "Dev C".

The correspondence between the job tickets illustrated in FIGS. 11 and 14 is as follows.

The second to tenth lines in FIG. 14 correspond to the 19th to 27th lines in FIG. 11. Similarly, the 12th line corresponds to the 31st line. The 13th line corresponds to the 37th line. The 14th line corresponds to the 38th line. The 15th line corresponds to the 39th line. The 16th line corresponds to the 40th line.

An example of a job ticket corresponding to the workflow on the screen illustrated in FIG. 9 will be described.

FIG. 15 is an example of a job ticket generated by the job ticket generating unit 26 (part 2).

The job ticket illustrated in FIG. 15 is a job ticket corresponding to the example of workflow illustrated in FIG. 9. The job ticket illustrated in FIG. 15 has the same format configuration as the job ticket illustrated in FIG. 11. Therefore, only the parts different from FIG. 11 will be described.

In the workflow illustrated in FIG. 9, one device "Dev E" executes both the printing process and the stitching process. In the stitching process in the job ticket illustrated in FIG. 15, i.e., in the 19th to 26th lines, the description of the 21st line that designates a processing device is the same as the description of the 12th line that designates a device of the printing process.

The relationship between the detail setting illustrated in FIG. 10 and the description of the job ticket illustrated in FIG. 15 will be described.

The content input in the detail setting screen illustrated in FIG. 10 is reflected on the job ticket illustrated in FIG. 15.

The set content of on/off 221 of the stitching function in FIG. 10 corresponds to "NoOp="false"" in the 35th line of FIG. 15.

The set content of the stitch position 222 corresponds to "StitchPosition="UpperLeftCorner"" of the 35th line.

Everything in the description of detail setting is referenced from the process of id003.

The workflow executing unit 30 distributes the job ticket illustrated in FIG. 15 to the devices and systems.

FIGS. 16 and 17 are job tickets after the job ticket of FIG. 15 is distributed.

The job ticket illustrated in FIG. 16 corresponds to the first process (process 150 in FIG. 9) in the job ticket illustrated in FIG. 15. The job ticket describes an instruction of the content processed in the system "Sys X". The workflow executing unit 30 extracts the job ticket illustrated in FIG. 16 from the job ticket illustrated in FIG. 15 and transmits the job ticket to the system "Sys X".

The correspondence between the job tickets illustrated in FIGS. 15 and 16 is as follows.

The second to ninth lines in FIG. 16 correspond to the second to ninth lines in FIG. 15. The workflow executing unit 30 copies the lines from the job ticket illustrated in FIG. 15 to the job ticket illustrated in FIG. 16.

The 11th line in FIG. 16 corresponds to the 28th line in FIG. 15. The workflow executing unit 30 copies the content corresponding to the description of the Device element with ID d001 referenced in the fourth line in FIG. 16 from the description of the job ticket illustrated in FIG. 15.

Similarly, the 12th line corresponds to the 30th line. The 13th line corresponds to the 31st line. The 14th line corresponds to the 32nd line.

The job ticket illustrated in FIG. 17 corresponds to the second and third processes in the job ticket illustrated in FIG. 15. The job ticket illustrated in FIG. 17 corresponds to the processes 151 and 152 in FIG. 9. The job ticket illustrated in FIG. 15 is described so that one device "Dev E" processes a plurality of consecutive processes in the second and third processes. Therefore, the workflow executing unit 30 puts the processes together into the job ticket to be transmitted to "Dev E" and extracts the job ticket. The job ticket illustrated in FIG. 17 describes an instruction of the content processed in the device "Dev E".

The correspondence between the job tickets illustrated in FIGS. 15 and 17 is as follows.

The content in the tenth to 26th lines in FIG. 15 is organized to obtain the second to 11th lines in FIG. 17. The values of "Types" described in the tenth and 19th lines of FIG. 15 are organized in the order of processes to obtain the description of "Types="DigitalPrinting Stitching"" in the second line of FIG. 17.

The fourth line in FIG. 17 corresponds to the 12th and 21st lines in FIG. 15. Since both contents designate to reference the device "Dev E", the workflow executing unit 30 copies only one line to the job ticket of FIG. 17.

The fifth line in FIG. 17 corresponds to the 13th line in FIG. 15.

The sixth line in FIG. 17 corresponds to the 14th line in FIG. 15.

The seventh line in FIG. 17 corresponds to the 15th line in FIG. 15.

The eighth line in FIG. 17 corresponds to the 23rd line in FIG. 15.

The ninth line in FIG. 17 corresponds to the 24th line in FIG. 15.

The 16th and 22nd lines in FIG. 15 indicate an association of the printing process and the stitching process. More specifically, the 16th and 22nd lines refer to the same 36th line with ID r015. The 16th line indicates "Usage="Output"", and the 22nd line indicates "Usage="Input"". Therefore, the workflow executing unit 30 determines the relationship between the printing process and the stitching process. Since the device "Dev E" alone executes the processes, the description in the job ticket in FIG. 17 can be omitted. The 13th line in FIG. 17 corresponds to the 29th line in FIG. 15.

Similarly, the 14th line corresponds to the 32nd line. The 15th line corresponds to the 33rd line. The 16th line corresponds to the 34th line. The 17th line corresponds to the 35th line. The 18th line corresponds to the 37th line.

The description of performance data as a basis of the UI and the job ticket description will be described.

(Description of Device Performance of Single Function System)

Performance data obtained from the systems and devices will be described.

FIG. 18 is an example of performance data obtained by the performance obtaining units 18 and 20 (part 1).

The performance data illustrated in FIG. 18 is an example corresponding to the icon 101 in the examples of workflow illustrated in FIGS. 7 and 9. The performance data is also an example corresponding to the job tickets illustrated in FIGS. 11, 12, 15, and 16.

As in the job tickets, a markup language is used as a format of the performance data in the present embodiment.

The job ticket generating unit 26 generates the job tickets illustrated in FIGS. 11 and 15 based on the information obtained from the performance data illustrated in FIG. 18 through the UI generating unit 25. The workflow executing unit 30 also extracts the job tickets illustrated in FIGS. 12 and 16 based on the information obtained from the performance data.

A correspondence between the performance data and the job tickets will be described.

In the first line of FIG. 18, "Types="LayoutPreparation"" indicates that the device (or system) executes an imposition process. The value is used to indicate the type of process in the workflow edit screen. This value is also used to generate, for example, the description "Type="LayoutPreparation"" of the first line in FIG. 11.

In the first line, "DeviceName="Sys X"" indicates that the device name is "Sys X". This value is used to indicate the device name among the types of processes in the workflow edit screen. The value is also used to generate, for example, the description of "name="Sys X"" of the 29th line in FIG. 11.

The description of the second to fourth lines in FIG. 18 corresponds to the fifth line in FIG. 11 and the 32nd line referenced from the fifth line. The description "Name="RunList"" of the second line in FIG. 18 is used to generate the RunListLink element of the fifth line in FIG. 11 and the RunList element of the 32nd line in FIG. 11. The element name of the fifth line of FIG. 11 is formed by adding "Link" to the name RunList.

In the second line of FIG. 18, "LinkUsage="Input"" indicates that the information is input information of process when the job ticket is generated. The information is used to generate the description of "Usage="Input"" of the fifth line in FIG. 11.

"TypeIndex="0"" of the second line in FIG. 18 will be described later.

In the third line of FIG. 18, the StringState element indicates that the configuration information described following the element is a character string type. The information is used to display the detail setting UI. In the third line of FIG. 18, "Name="Filename"" corresponds to the description "Filename="input.pdf"" of the 32nd line in FIG. 11. In the third line of FIG. 18, "AllowedRegExp=".*"" indicates a valid value (character strings) as a set value of "Filename" in a regular expression. Arbitrary character strings are permitted in the example.

The description of the fifth to ninth lines in FIG. 18 is used for the LayoutPreparationParamsLink element of the sixth line in FIG. 11 and the LayoutPreparationParams element of the 33rd line referenced from the sixth line.

The meaning of the description of the fifth line of FIG. 18 is the same as described in the second line.

The XYPairState element of the sixth line in FIG. 18 indicates that the configuration information described following the element is an XYPair type, or a set of two values, and especially, the values indicate two dimensional vector information. The values of the type are expressed by a character string made of two numeric values partitioned by a space. In the sixth line of FIG. 18, "Name="NumberUp"" corresponds to "NumberUp="2 2"" of the 33rd line in FIG. 11. In the sixth line of FIG. 18, "AllowedValueList="1 1~2 2"" indicates that the valid value as a set value of "NumberUp" is within the range of "1 1" to "2 2". Thus, values such as "1 1", "1 2", "2 1", and "2 2" can be set.

The NameState element of the seventh line in FIG. 18 indicates that the configuration information described following the element is a Name type. In the seventh line of FIG. 18, "Name="Sides"" corresponds to "Sides="TwoSidedFlipX"" of the 33rd line in FIG. 11. The description started from "AllowedValueList" of the seventh line in FIG. 18 indicates that any of the four listed values can be selected as a value of "Sides".

In the eighth line of FIG. 18, "Name="ImageShift"" corresponds to "ImageShift="10 12"" of the 33rd line in FIG. 11. The meaning of "AllowedValueList" in the XYPair type is as described in the example of the sixth line.

The description of the tenth line in FIG. 18 is used to generate the RunListLink element of the seventh line in FIG. 11 and the RunList Element of the 34th element referenced from the seventh line. In the tenth line of FIG. 18, "LinkUsage="Output"" indicates that the information is output information of process when the job ticket is generated. The information is also used to generate the description of "Usage="Output"" of the seventh line in FIG. 11. Since there is no configuration parameter for the RunList, only the tenth line is described.

This completes the description of the performance data for a system with a single function called imposition process.

A format of performance data for a device including multiple functions will be described further.

(Description of Device Performance of Multifunctional Device)

FIG. 19 is an example of performance data obtained by the performance obtaining units 18 and 20 (part 2).

The performance data illustrated in FIG. 19 corresponds to the icons 140, 141, and 142 of FIGS. 7 and 9. The performance data also corresponds to the job tickets illustrated in FIGS. 11, 13, 15, and 17.

A correspondence between the performance data and the job tickets will be described.

In FIG. 19, "CombinedMethod="Combined"" of the first line indicates that the device (or the system) includes a plurality of functions. In this case, a plurality of processes are also listed in the description of "Types" in the first line. In the values of "Types" of the first line, "DigitalPrinting" indicates a printing process, "Stitching" indicates a stitching process, and "HoleMaking" indicates a punching process. The values are partitioned into performance data of the processes according to the following processes and used to indicate the types of processes on the workflow edit screen. The values are also used to generate, for example, the description of "Types="DigitalPrinting"" of the tenth line in FIG. 11.

In the first line of FIG. 19, "DeviceName="Dev E"" indicates that the device name is "Dev E". This value is used to indicate the device name in the types of processes on the workflow edit screen. The value is also used to generate, for example, the description of "name="Dev E"" of the 30th line in FIG. 11.

The second line in FIG. 19 corresponds to the 13th line in FIG. 11 and the 34th line referenced from the 13th line. "Name" and "LinkUsage" are as described in the example of FIG. 18. In the second line of FIG. 19, "TypeIndex="0"" designates to which of the processes listed in "Types" in the first line of FIG. 19 the parameter corresponds. Numbers are attached beginning with 0 in the order described in "Types". Thus, 0 denotes "DigitalPrinting", 1 denotes "Stitching", and 2 denotes "HoleMaking". In the example of FIG. 18, since the performance data indicates only one process, "Types="0"" is always illustrated.

The description of the third to seventh lines in FIG. 19 corresponds to the 14th line in FIG. 11 and the 35th line referenced from the 14th line.

The IntegerState element in the fourth line of FIG. 19 indicates that the configuration information described following the element is an integer type. "Name" and "AllowedValueList" are as described above. In the fourth line of FIG. 19, "Description="density adjustment"" indicates a notation used as a set item name when this set value is displayed on the UI. More specifically, the notation corresponds to the display of 211 in FIG. 8. If there is no description of "Description", the name in the job ticket description described in "Name" is used.

The EnumerationState element in the sixth line of FIG. 19 indicates that the configuration information described following the element is an enumeration type. "Name", "AllowedValueList", and "Description" are as described above.

The description of the eighth to 11th lines in FIG. 19 corresponds to the 15th line in FIG. 11 and the 36th line referenced from the 15th line.

The description of the 12th line in FIG. 19 corresponds to the 16th line in FIG. 11 and the 37th line referenced from the 16th line. The description also corresponds to the 16th and 22nd lines in FIG. 15 and the 36th line referenced from the 16th and 22nd lines.

In the 12th line of FIG. 19, "LinkUsage" is not described. Two values of "TypeIndex" are described, such as "TypeIndex="0 1"". The description of "Component" illustrated as "Name="Component"" indicates an intermediate setting for associating the printing process (="TypeIndex="0"") and the stitching process (="TypeIndex="1""). With the description, the job ticket is generated as follows. If the functions of the device "Dev E" are used alone, or for example, in the example of FIG. 13, the Component element and the ComponentLink element are individually described in the job ticket. However, if a plurality of functions are consecutively used in the device "Dev E", or for example, in the example of FIG. 17, the Component element and the ComponentLink element are omitted from the job ticket.

The description in the 13th to 16th lines in FIG. 19 corresponds to the 23rd line in FIG. 15 and the 35th line referenced from the 23rd line. In the example of FIG. 11, there is no corresponding description because a stitching process of another device is used.

The BooleanState element of the 14th line in FIG. 19 indicates that the configuration information described following the element is a Boolean type. "Name", "AllowedValueList", and "Description" are as described above. In the 14th line of FIG. 19, "ValueDesc="OFF ON"" indicates a notation used as a set value (candidate) when this set value is displayed on the UI. The listed values "OFF" and "ON" correspond to the values listed in "AllowedValueList". Thus, if "OFF" is selected on the UI, "NoOp="true"" is described in the job ticket. If "ON" is selected on the UI, "NoOp="false"" is described in the job ticket. If there is no description of "ValueDesc", the name in the job ticket description described in "AllowedValueList" is also used on the UI.

(Still Another Description of Performance Data)

FIG. 20 is an example of performance data acquired by the performance obtaining units 18 and 20 (part 3).

The performance data illustrated in FIG. 20 is an example corresponding to the icon 147 in the example of workflow illustrated in FIG. 7 and the icon 104 in FIG. 3. The performance data is also an example corresponding to the job tickets illustrated in FIGS. 11 and 14.

As described, the performance data of the devices and systems obtained by the performance obtaining units 18 and 20 include single function data and multiple function data. The workflow system 1 in the present embodiment executes processes after partitioning the performance data of a device including multiple functions into performance data of individual processes.

The result of partitioning the performance data of a device including multiple functions into performance data of individual processes will be described.

(Division of Performance Data)

FIGS. 21 to 23 illustrate examples of performance data processed by the workflow system.

The performance data illustrated in FIG. 21 is obtained by extracting the part of functions related to the printing process from the performance data illustrated in FIG. 19.

In the extraction of the performance data illustrated in FIG. 21, only the process as a result of the extraction is described (extracted), such as the description "Types="DigitalPrinting"" in the first line of FIG. 21. As illustrated in the 12th line, only necessary processes are described (extracted) in the parts where a plurality of "TypeIndex" are described for intermediate setting for associating a plurality of processes.

The part of function related to the stitching process as a second process illustrated in FIG. 19 is extracted from the performance data illustrated in FIG. 19 to obtain the performance data illustrated in FIG. 22.

The part of function related to the punching process as a third process illustrated in FIG. 19 is extracted from the performance data illustrated in FIG. 19 to obtain the performance data illustrated in FIG. 23.

In this way, the processes of a device with a plurality of functions are partitioned into individual processes, which are then displayed as processes selectable in the workflow system 1.

(Flow of Process)

Figure 24:
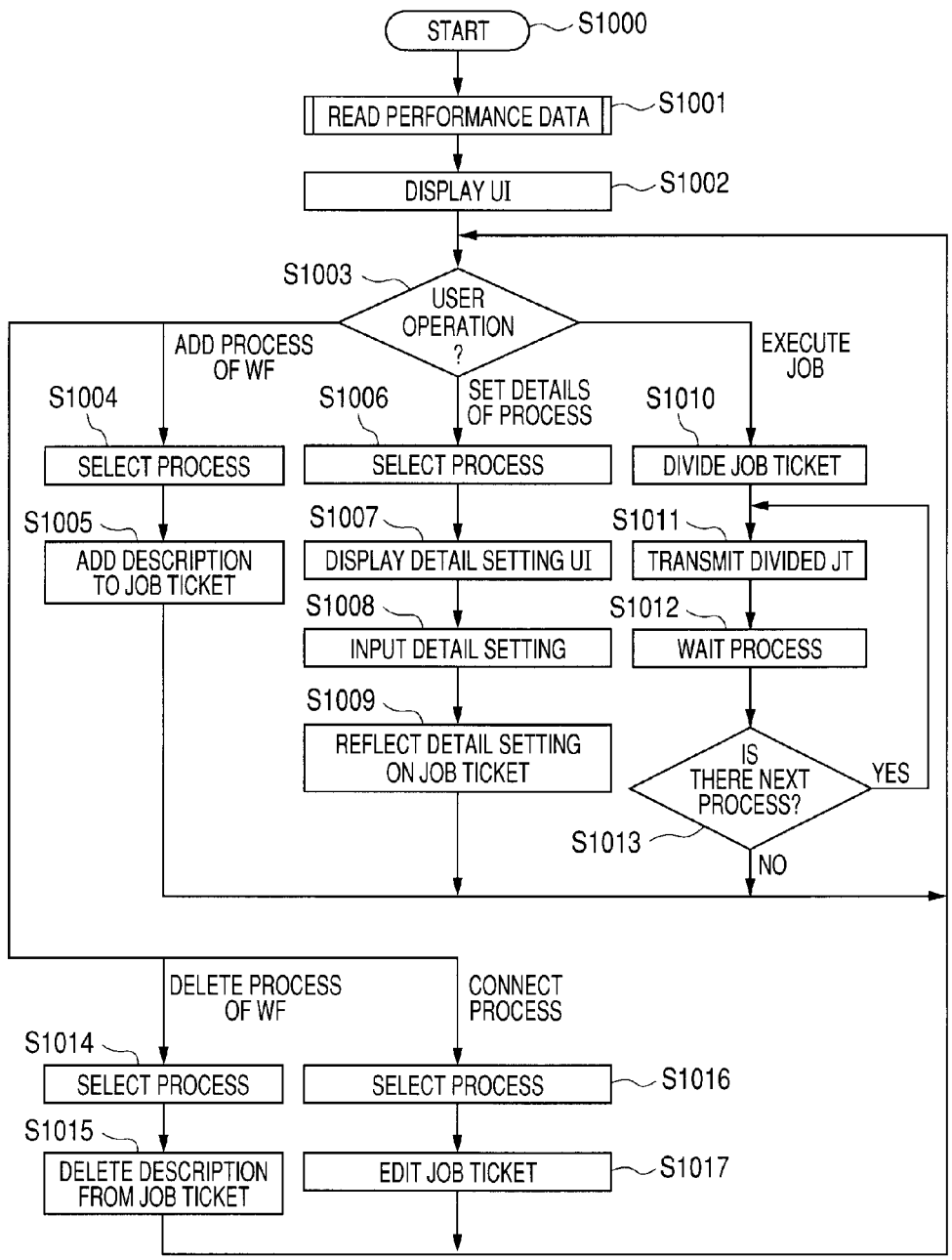
FIG. 24 is a flow chart of a flow of a process in the workflow system 1.

FIG. 24 is a flow chart of a flow of a process in the workflow system 1.

In step S1000, the workflow system 1 starts the process. In step S1001, the workflow system 1 obtains performance data from all connected systems and devices, partitions the performance data into individual performance data if a device includes a plurality of devices, and stores the performance data in a storage device. Details of the process of step S1001 will be described later with reference to FIG. 25, etc.

In step S1002, the workflow system 1 creates and displays a screen for editing the workflow based on the information stored in step S1001 and waits for input from the user. The workflow editing unit 28 executes the process of step 1002 based on information from the UI generating unit 25.

In step S1003, the workflow editing unit 28 divides the process according to the operation of the user. In the case of an operation for adding a process to the editing workflow, the workflow editing unit 28 proceeds to step S1004. In the case of an operation for setting details of processes in the workflow, the workflow editing unit 28 proceeds to step S1006. In the case of an operation for executing a job according to the created workflow, the workflow editing unit 28 proceeds to step S1010. In the case of an operation for deleting a process from the editing workflow, the workflow editing unit 28 proceeds to step S1014. In the case of instructing association of a plurality of processes (connecting the processes on the screen with arrows), the workflow editing unit 28 proceeds to step S1016.

In step S1004, the workflow editing unit 28 selects a process to be added to the workflow according to the operation of the user. More specifically, the workflow editing unit 28 selects a process to be added to the workflow according to the user's operation of selecting an icon of a process from the area on the left side illustrated in FIG. 3.

In step S1005, the job ticket generating unit 26 adds a description of a job ticket corresponding to the performance data of the selected process.

After step S1005, the workflow system 1 returns to the process of step S1003 and waits for the next user operation.

In step S1006, the workflow editing unit 28 selects a process (icon) for inputting detail setting from the workflow according to the operation of the user. More specifically, the workflow editing unit 28 selects the detail setting menu button 121 according to the user's operation of selecting the detail setting menu button 121 in FIG. 4.

In step S1007, the detail setting editing unit 29 displays the detail setting screen of the process selected in step S1006. This is equivalent to, for example, the display of the screen illustrated in FIG. 5.

In step S1008, the detail setting editing unit 29 inputs the detail setting according to the operation of the user.

In step S1009, the job ticket generating unit 26 edits the job ticket according to the content input in step S1008 and reflects the detail setting on the job ticket. After step S1009, the workflow system 1 returns to the process of step S1003 and waits for the next user operation.

In step S1010, the workflow executing unit 30 divides the job ticket describing the workflow for each system and device.

In step S1011, the workflow system 1 transmits the divided job tickets to corresponding devices from the first process of the workflow. For example, the workflow executing unit 30 divides the job tickets, and the job ticket transmitting unit 19 or the job ticket transmitting unit 21 actually transmits the job tickets.

In step S1012, the workflow executing unit 30 waits for the processes of the job tickets transmitted in step S1011 to end.

In step S1013, the workflow executing unit 30 determines whether there is a next process of workflow, or a job ticket to be transmitted next. If there is a job ticket to be transmitted (Yes), the workflow executing unit 30 returns to step S1011 and transmits the next job ticket to the corresponding device. Otherwise (No), the workflow executing unit 30 returns to step S1003 and waits for the next user operation.

In step S1014, the workflow editing unit 28 selects a process to be deleted from the workflow according to the operation of the user. More specifically, the workflow editing unit 28 selects a process to be deleted from the workflow according to the user's operation of selecting 122 of FIG. 4.

In step S1015, the job ticket generating unit 26 deletes the description in the job ticket corresponding to the process selected in step S1014.

After step S1015, the workflow system 1 returns to step S1003 and waits for the next user operation.

In step S1016, the workflow editing unit 28 selects two processes to be associated according to the operation of the user and connects the processes with an arrow.

In step S1017, the job ticket generating unit 26 edits the job ticket to associate the two selected processes.

After step S1017, the workflow system 1 returns to step S1003 and waits for the next user operation.

Figure 25B:
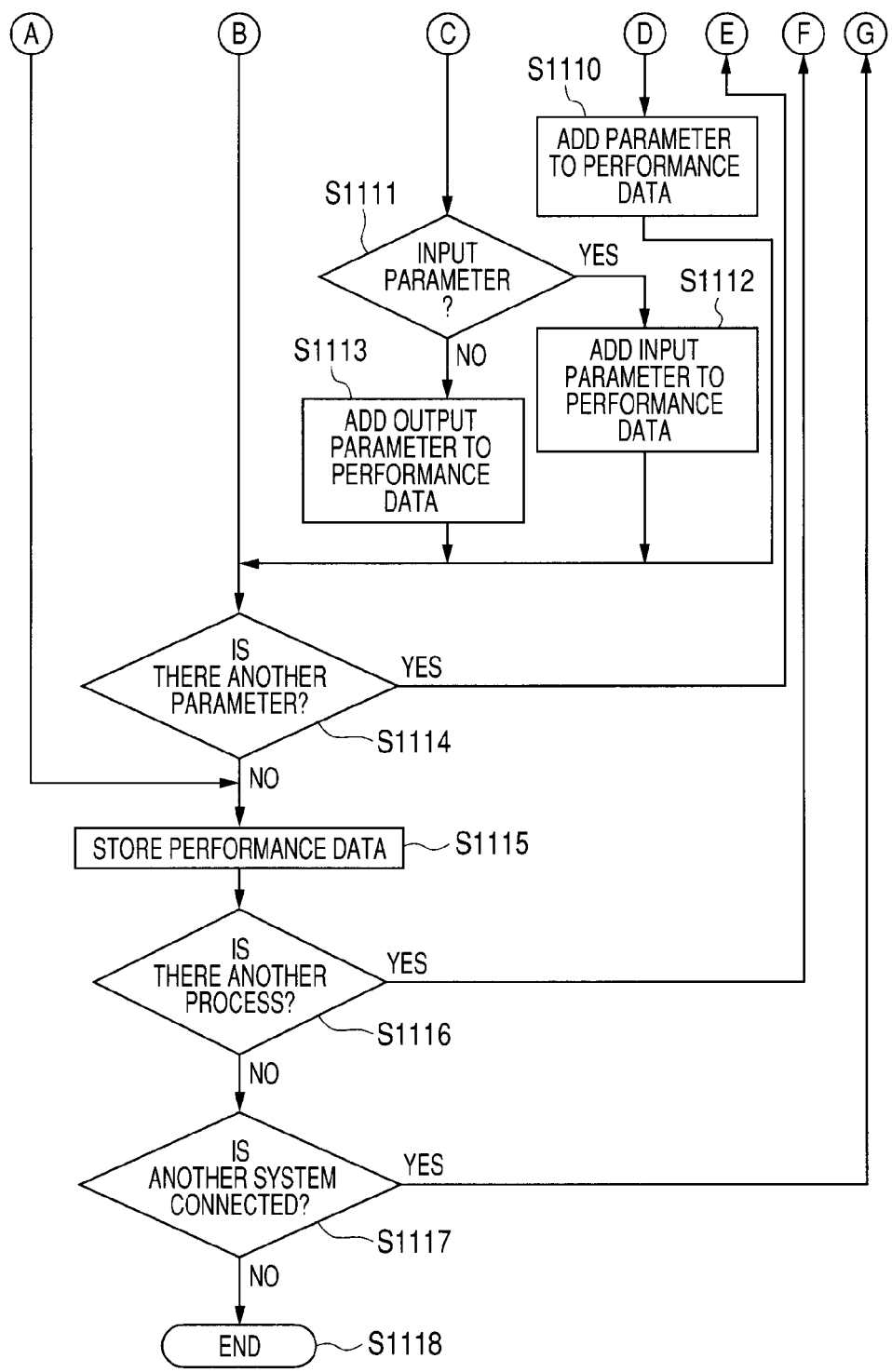
FIG. 25 is comprised of FIGS. 25A and 25B illustrating flow charts of a flow of a process corresponding to step S1001 in FIG. 24.

FIG. 25 is a flow chart of a flow of a process corresponding to step S1001 in FIG. 24.

In step S1100, the workflow system 1 starts the process. In step S1101, the performance obtaining units 18 and 20 obtain performance data from the devices (obtain performance data).

In step S1102, the process partitioning unit 23 determines whether the performance data includes multiple functions. In this determination method, the determination can be made by referring to the description of "DeviceCap Combined Method" of the performance data. The process partitioning unit 23 proceeds to step S1104 if multiple functions are included (Yes) and proceeds to step S1103 in the case of single function.

In step S1103, the process partitioning unit 23 replicates the performance data and then proceeds to step S1115.

In step S1104, the process list obtaining unit 22 obtains a list of processes corresponding to the performance data.

In step S1105, the process partitioning unit 23 holds, in a variable P, the numbers of processes in the order of the process list of the performance data beginning from the first (0th).

In step S1106, the process partitioning unit 23 prepares basic data of the performance data to generate Pth performance data. The basic data includes information such as the type of process.

In step S1107, the parameter obtaining unit 24 inputs parameters (configuration parameters) in the order of the original performance data (obtain configuration parameters).

In step S1108, the parameter obtaining unit 24 determines whether the input configuration parameters include the Pth process based on the value of "TypeIndex". If the Pth process is included (Yes), the parameter obtaining unit 24 proceeds to step S1109. If not included, the parameter obtaining unit 24 proceeds to step S1114.

In step S1109, the parameter obtaining unit 24 determines whether the input configuration parameter is a configuration parameter related to multiple process association (process association parameter). The parameter obtaining unit 24 makes the determination based on the fact that LinkUsage is not included and that a plurality of values are listed in TypeIndex. If the configuration parameter is related to the multiple process association (Yes), the parameter obtaining unit 24 proceeds to step S1111. Otherwise, the parameter obtaining unit 24 proceeds to step S1110.

In step S1110, the parameter obtaining unit 24 adds the configuration parameter to the performance data prepared in step S1108. In that case, TypeIndex is set to 0.

In step S1111, the parameter obtaining unit 24 determines whether the configuration parameter related to the multiple process association is defined as a configuration parameter for input in the process. The parameter obtaining unit 24 determines that the configuration parameter is for output if P is the smaller one of the numbers listed in TypeIndex and determines that the configuration parameter is for input if P is the larger one. In the case of the configuration parameter for input (Yes), the parameter obtaining unit 24 proceeds to step S1112. Otherwise, or in the case of the configuration parameter for output, the parameter obtaining unit 24 proceeds to step S1113.

In step S1112, the parameter obtaining unit 24 adds the configuration parameter related to the multiple process association to the performance data prepared in step S1108 as a configuration parameter for input. In that case, TypeIndex is set to 0. LinkUsage is set to Input.

In step S1113, the parameter obtaining unit 24 adds the configuration parameter related to the multiple process association to the performance data prepared in step S1108 as a configuration parameter for output. In that case, TypeIndex is set to 0. LinkUsage is set to Output.

In step S1114, the parameter obtaining unit 24 determines whether there is another configuration parameter to be added. If there is a configuration parameter (Yes), the parameter obtaining unit 24 returns to step S1107 and processes the next configuration parameter. When all configuration parameters are processed, the parameter obtaining unit 24 proceeds to step S1115.

In step S1115, the process storage unit 27 stores the resulting new performance data in a storage device such as a cache memory and an HDD.

In step S1116, for example, the process partitioning unit 23 determines whether there is a next process that should be processed in the performance data. If there is a next process (Yes), the process partitioning unit 23 returns to step S1105, increments P, and extracts the next performance data. Otherwise, the process partitioning unit 23 proceeds to step S1117.

In step S1117, for example, the process list obtaining unit 22 determines whether there is another connected system or device. If there is another system or device from which the performance data should be obtained, the process list obtaining unit 22 returns to step S1104 and repeats the process. When the performance data of all systems and devices are obtained, the process list obtaining unit 22 proceeds to step S1118 and ends the process illustrated in FIG. 25.

(Configuration of Server PC)

A hardware configuration of the workflow system (server PC or information processing apparatus) 1 will be described with reference to FIG. 26. The hardware configuration introduced here is only an example.

The part surrounded by the dotted line is a board called a mother board. Two CPUs control the entire software of the server PC and are connected to a cache memory through a CPU bus. LSI chips called a north bridge and a south bride further control various buses on the mother board. A memory such as an SDRAM is used for temporarily storing the data, such as data exchanged between the north bridge and the south bridge, inside the server PC.

The north bridge includes a high-speed PCI bus. In this case, an SCSI external device (for example, hard disk drive of large-capacity data) can be accessed through an SCSI controller and an SCSI interface. A graphic controller for displaying a display is connected to the north bridge through an AGP bus.

A universal PCI bus (32 bit/33 MHz) is connected to the south bridge, and NICs (Network Interface Cards) such as Ethernet (registered trademark) are connected. The south bridge also includes an IDE bus, and a hard disk drive, a CD-ROM drive, a DVD drive, etc., are connected to the south bridge. The hard disk drive stores various data such as control software of the server PC. USB ports allow access to an USB external device represented by a USB memory.

Connections to a keyboard, a mouse, and a Floppy (registered trademark) disk drive can be made through a super I/O unit to input and output data.

The CPUs execute programs stored in the hard disk drive, etc., to realize the functions of the workflow system 1 described above.

As described, the functions that can be partitioned from the process list describing the performance data are extracted, and the partitioned functions can be combined during the creation of the workflow. In this way, the user can easily create an accurate workflow without impairing the scalability of an existing workflow system.

Second Embodiment

The basic configuration of a second embodiment is the same as in the first embodiment, and only differences from the first embodiment will be described.

In a plurality of functions included in one device, there are functions that can be used alone and functions that cannot be used alone. For example, a print function of a POD machine can be used alone. Thus, printing only can be performed. However, many finishers cannot be used alone. For example, stapling cannot be performed alone. Meanwhile, some of the finishers can use functions alone.

In the second embodiment, the systems and devices provide information of effective combinations of processes in the performance data.

FIG. 27 is an example of performance data obtained by the performance obtaining units 18 and 20 (part 4). In FIG. 27, the second to seventh lines indicate all combinations of functions usable in the present device. The third to sixth lines indicate effective combinations of the functions.

Figure 28B:
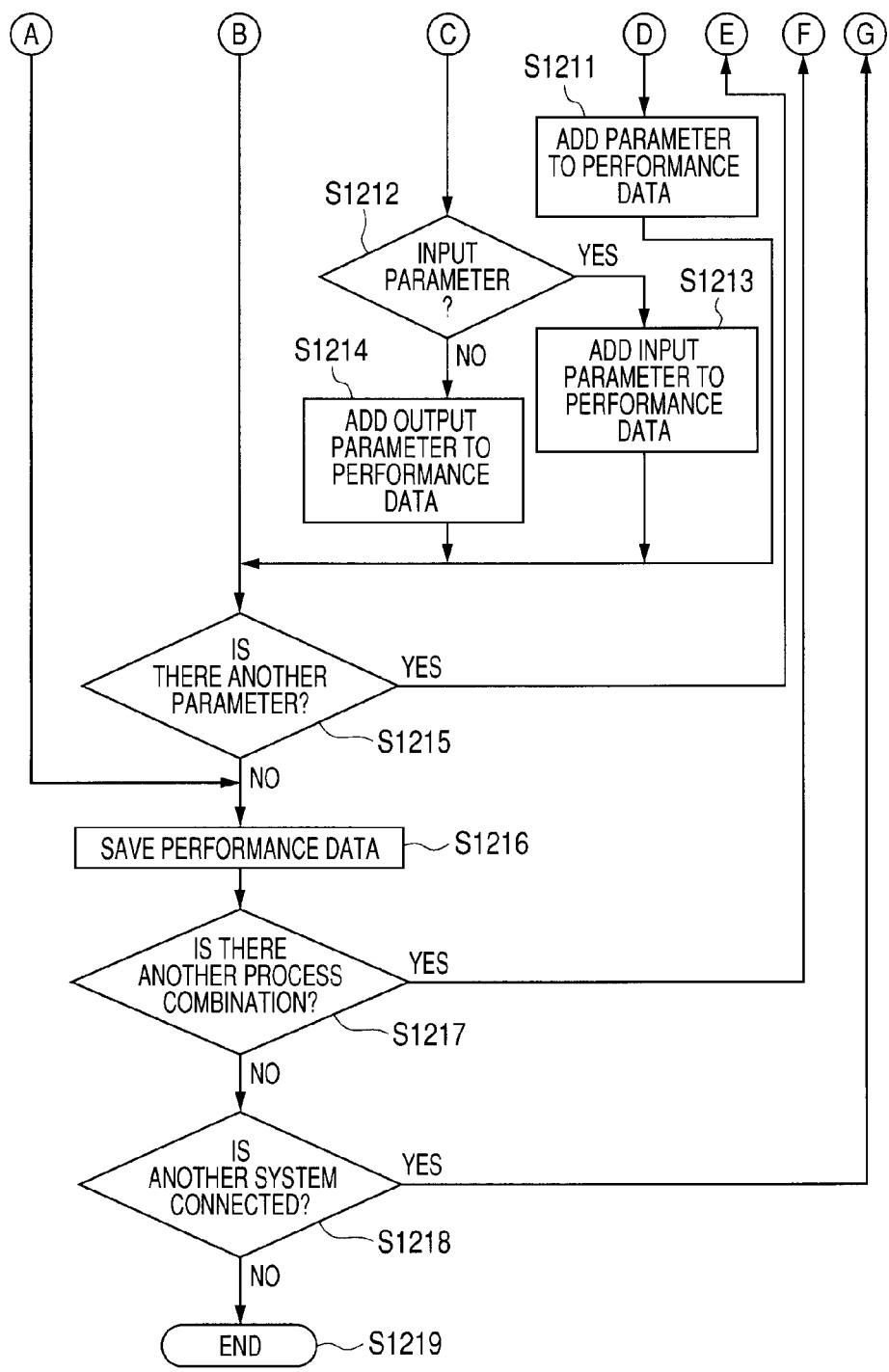
FIG. 28 is comprised of FIGS. 28A and 28B illustrating flow charts of a flow of a process of a second embodiment corresponding to step S1001 of FIG. 24 of the first embodiment.

FIG. 28 is a flow chart of a flow of a process of the second embodiment corresponding to step S1001 of FIG. 24 of the first embodiment.

In step S1200, the workflow system 1 starts the process. In step S1201, the performance obtaining units 18 and 20 obtain performance data from a device.

In step S1202, the process partitioning unit 23 determines whether the performance data includes multiple functions. The process partitioning unit 23 proceeds to step S1204 if multiple functions are included (Yes) and proceeds to step S1203 in the case of single function.

In step S1203, the process partitioning unit 23 replicates the performance data and proceeds to step S1216.

In step S1204, the process list obtaining unit 22 obtains a combination list of functions corresponding to the performance data. This corresponds to the process of obtaining the combinations described in the third to sixth lines in FIG. 27.

In step S1205, the process partitioning unit 23 sequentially obtains the combinations of functions.

In step S1206, the process partitioning unit 23 prepares basic data of the performance data for the combinations obtained in step S1205. The data includes information such as the types of processes.

In step S1207, the parameter obtaining unit 24 obtains a process number list corresponding to the combinations of functions.

In step S1208, the parameter obtaining unit 24 inputs configuration parameters in the order of the original performance data.

In step S1209, the parameter obtaining unit 24 determines whether the input configuration parameter includes a process corresponding to the number list obtained in step S1207 from the value of "TypeIndex". If the process is included (Yes), the parameter obtaining unit 24 proceeds to step S1210. If not included, the parameter obtaining unit 24 proceeds to step S1215.

In step S1210, the parameter obtaining unit 24 determines whether the input configuration parameter is a configuration parameter related to multiple process association. The parameter obtaining unit 24 makes the determination based on the fact that LinkUsage is not included and that a plurality of values are listed in TypeIndex. If the configuration parameter is related to the multiple process association (Yes), the parameter obtaining unit 24 proceeds to step S1212. Otherwise, the parameter obtaining unit 24 proceeds to step S1211.

In step S1211, the parameter obtaining unit 24 adds the configuration parameter to the performance data prepared in step S1206.

In step S1212, the parameter obtaining unit 24 determines whether the configuration parameter related to the multiple process association is defined as a configuration parameter for input in the process. In the case of the configuration parameter for input (Yes), the parameter obtaining unit 24 proceeds to S1213. Otherwise, or in the case of the configuration parameter for output, the parameter obtaining unit 24 proceeds to step S1214.

In step S1213, the parameter obtaining unit 24 adds the configuration parameter related to the multiple process association to the performance data prepared in step S1206 as a configuration parameter for input.

In step S1214, the parameter obtaining unit 24 adds the configuration parameter related to the multiple process association to the performance data prepared in step S1206 as a configuration parameter for output.

In step S1215, the parameter obtaining unit 24 determines whether there is another configuration parameter to be added. If there is another configuration parameter to be added (Yes), the parameter obtaining unit 24 returns to step S1208 and processes the next parameter. When all configuration parameters are processed, the parameter obtaining unit 24 proceeds to step S1216.

In step S1216, the process storage unit 27 stores the resulting new performance data in a storage device such as a cache memory and an HDD.

In step S1217, whether there is a next process combination to be processed in the performance data is determined. If there is a next combination (Yes), the process returns to step S1205, Q is incremented, and the next performance data is extracted. Otherwise, the process proceeds to step S1218.

In step S1218, whether there is another connected system or device is determined. If there is another system or device from which the performance data should be obtained, the process returns to step S1204, and the process is repeated. If the performance data of all systems and devices are obtained, the process proceeds to step S1219, and the process ends.

Figure 29:
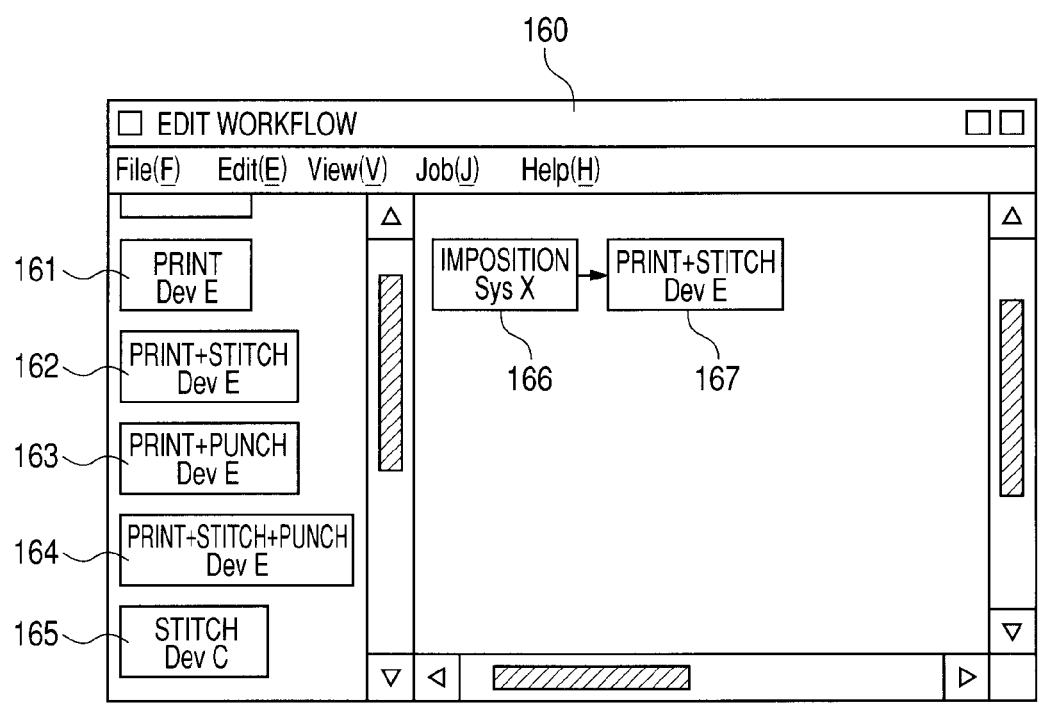
FIG. 29 is an example of the workflow edit screen (part 4).

FIG. 29 is an example of a workflow edit screen (part 4).

As shown in FIG. 29, the workflow system 1 uses the extracted performance data to display processing icons according to the flow chart of FIG. 28. The workflow system 1 uses only the effective combinations of processes to edit the workflow according to the operation of the user.

Figure 30:
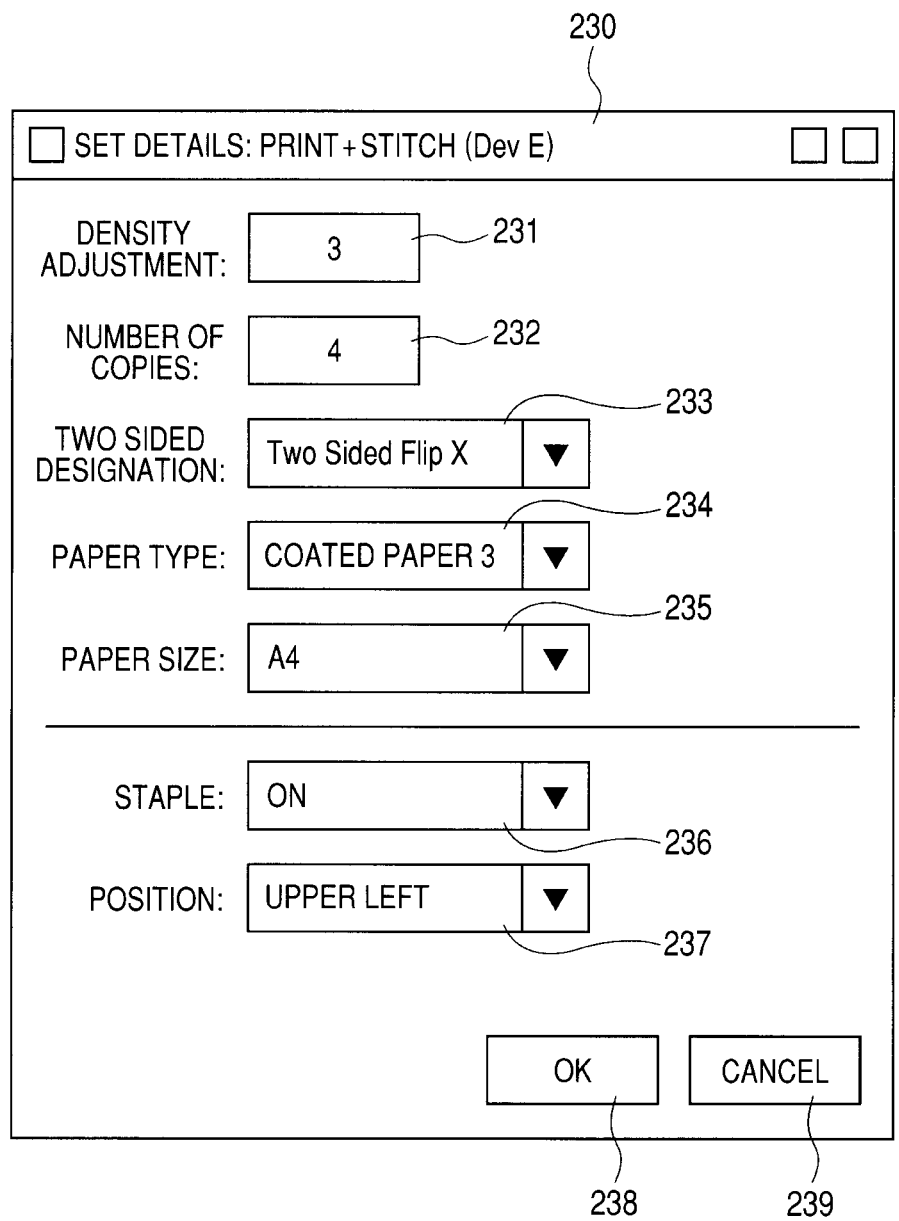
FIG. 30 is an example of a detail setting screen related to a combined process of printing and stitching illustrated with 167 of FIG. 29.

FIG. 30 is an example of a detail setting screen related to a combined process of printing and stitching illustrated with 167 of FIG. 29. As shown in FIG. 30, the workflow system 1 organizes and displays the detail settings of combined functions on one setting screen.

As described, according to the present embodiment, the workflow system 1 receives information of effective combinations among the multiple functions from a connected device and edits the workflow based on the information. As a result, the user can use functions of effective combinations to create the workflow even if functions that cannot be used alone are included.

Third Embodiment

The basic configuration of a third embodiment is the same as in the first embodiment, and only differences from the first embodiment will be described.

As in the second embodiment, there are functions that can be used alone and functions that cannot be used alone in a plurality of functions included in one device in the third embodiment.

As in the first embodiment, information of effective combinations is not separately provided from the devices in the third embodiment. As in the first embodiment, the workflow system 1 creates effective combinations of functions (combination list) from the performance data in the third embodiment.

Figure 31:
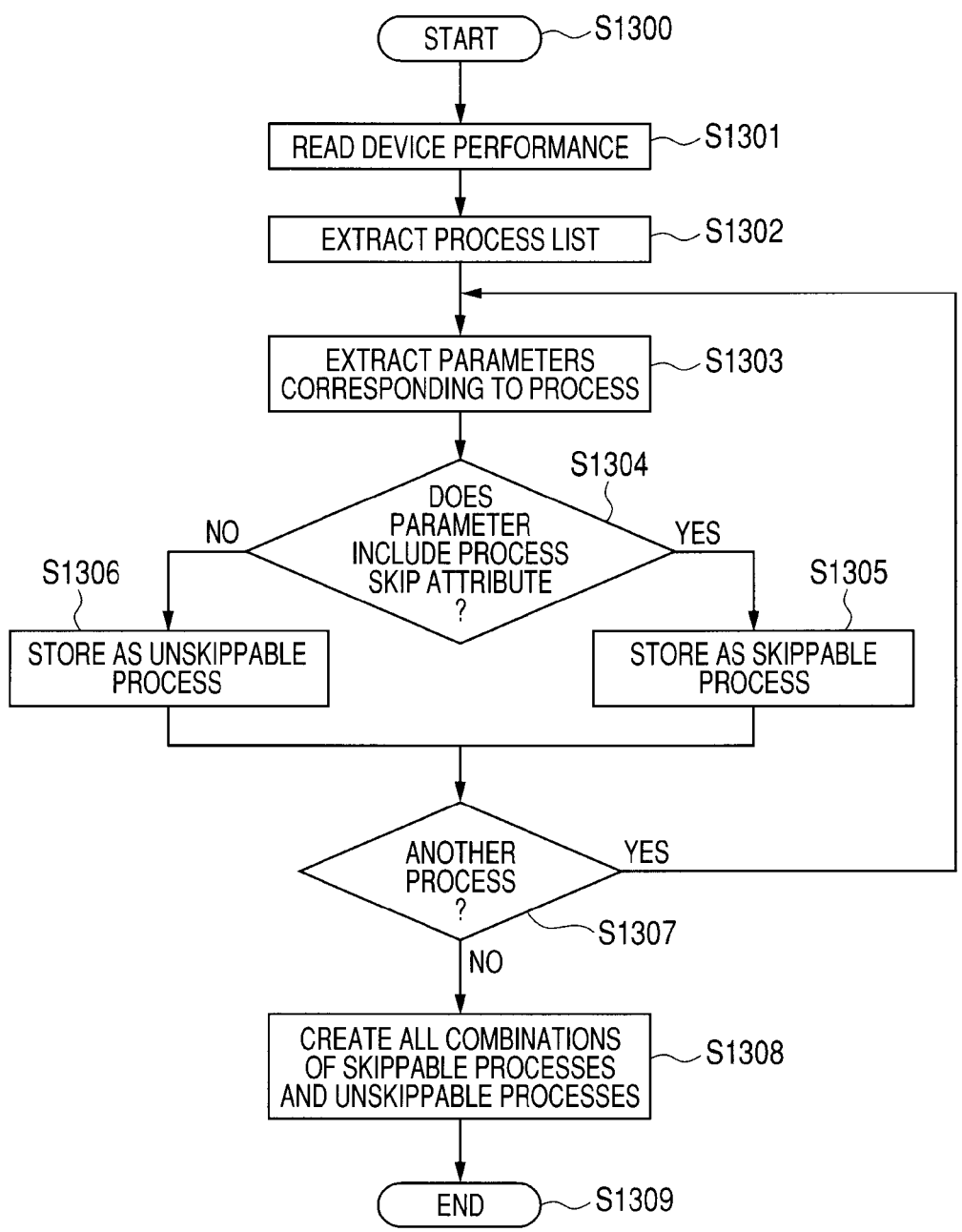
FIG. 31 is a flow chart of an example of a combination list creating process.

FIG. 31 is a flow chart of an example of a combination list creating process. The flow chart of FIG. 31 is equivalent to an alternative process of the process of step S1204 in the flow chart of FIG. 28 in the second embodiment.

In step S1300, the workflow system 1 starts the process. In step S1301, the process list obtaining unit 22 reads performance data. For example, the process list obtaining unit 22 reads the performance data illustrated in FIG. 19.

In step S1302, the process list obtaining unit 22 extracts a list of processes included in the performance data. In the case of the performance data illustrated in FIG. 19, the process list obtaining unit 22 obtains three process lists, DigitalPrinting, Stitching, and HoleMaking, from the value of Types of the first line.

From step S1303, the process list obtaining unit 22 sequentially repeats the processes.

In step S1303, the process list obtaining unit 22 extracts parameters corresponding to the process. For example, in the case of DigitalPrinting, the process list obtaining unit 22 extracts RunList, DigitalPrintingParams, Media, and Component in which the values of TypeIndex are 0.

In step S1304, the process list obtaining unit 22 determines whether the extracted parameters include a skip attribute. The skip attribute denotes a parameter that can designate effective/ineffective of functions process by process. More specifically, the skip attribute denotes whether a NoOp parameter is included in the example of the performance data illustrated in FIG. 19. For example, a NoOp parameter is not included in the parameters of DigitalPrinting. The parameters of Stitching include the NoOp parameter (14th line of FIG. 19). The parameters of HoleMaking also include the NoOp parameter (19th line of FIG. 19). If the skip parameter is included (Yes), the process list obtaining unit 22 proceeds to step S1305. Otherwise, the process list obtaining unit 22 proceeds to step S1306.

In step S1305, the process list obtaining unit 22 stores a corresponding process as a "skippable process (process that can be skipped)".

In step S1306, the process list obtaining unit 22 stores a corresponding process as an "unskippable process (process that cannot be skipped)".

In step S1307, the process list obtaining unit 22 determines whether there is a process remaining, in which the existence of the skip attribute is not determined, in order to repeat the process for all processes extracted in step S1302. If there is another process (Yes), the process list obtaining unit 22 returns to step S1303. Otherwise, the process list obtaining unit 22 proceeds to step S1308.

In step S1308, the process list obtaining unit 22 creates all combinations of the skippable processes and adds the unskippable processes to the combinations to create a combination list of effective processes (create combination information). For example, in the case of the performance data of FIG. 19, the unskippable process is DigitalPrinting, and the skippable processes are Stitching and HoleMaking. If the process list obtaining unit 22 creates all combinations of the unskippable processes, four combinations, "(No Process)", "Stitching", "HoleMaking", and "Stitching HoleMaking", are made. Adding DigitalPrinting can form the following four combinations:

"DigitalPrinting",
"DigitalPrinting Stitching",
"DigitalPrinting HoleMaking", and
"DigitalPrinting Stitching HoleMaking".

In step S1309, the process list obtaining unit 22 ends the combination list creating process.

Figure 32:
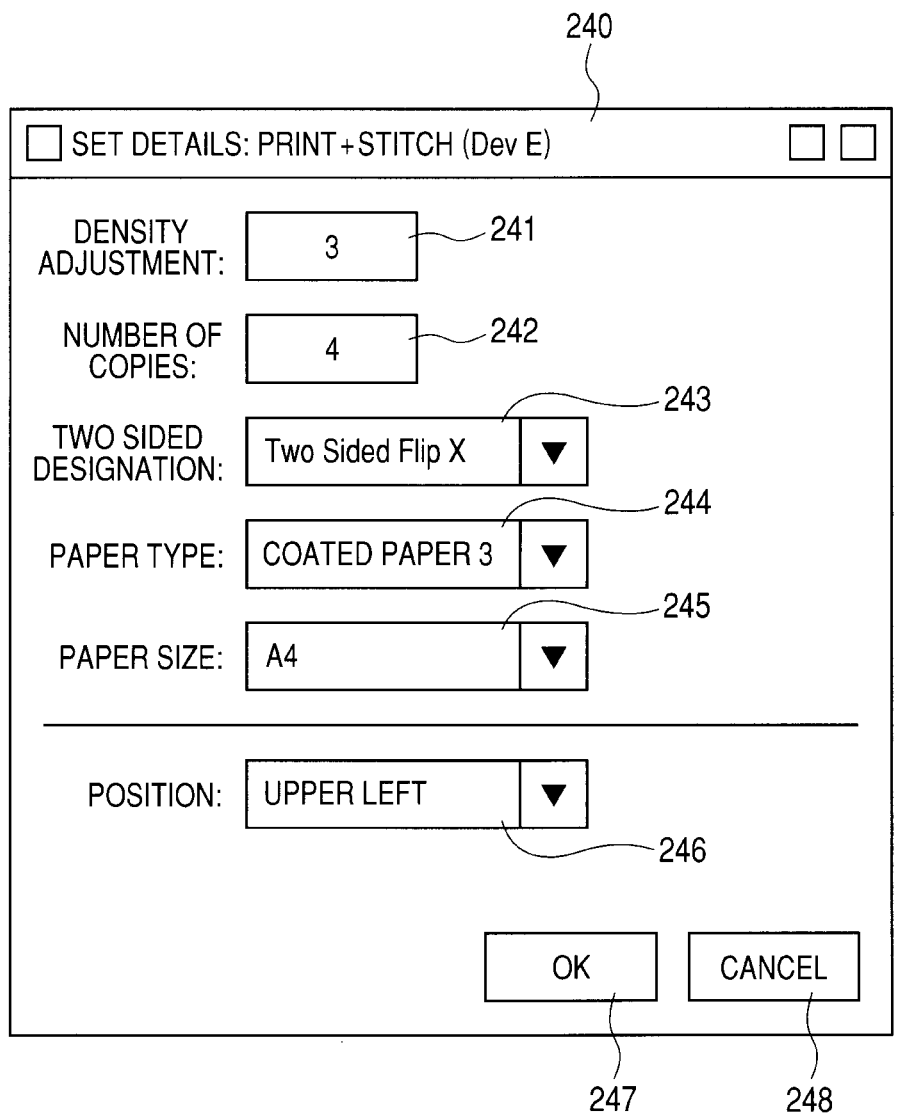
FIG. 32 is an example of a detail setting screen related to the combined process of printing and stitching.

The edit screen of the workflow is the same as the example of screen of FIG. 29 in the second embodiment. FIG. 32 is an example of a detail setting screen related to the combined process of printing and stitching. As illustrated in FIG. 32, the workflow system 1 determines the combination based on the skip attribute. Therefore, the On/Off setting of functions is excluded from the screen of detail setting.

As described, according to the present embodiment, the workflow system 1 determines the skip attribute of the performance data to generate information of effective combinations of multiple functions and edits the workflow based on the information.

In this way, the user can use effective combinations of functions to create a workflow even if functions unusable alone are included.

Fourth Embodiment

The basic configuration of a fourth embodiment is the same as in the first embodiment, and only differences from the first embodiment will be described.

In the fourth embodiment, if a device includes a plurality of functions, the workflow system 1 internally partitions the performance data into individual functions as in the first embodiment. However, the workflow system 1 does not display the partitioned individual functions as independent processes on the workflow edit screen.

Figure 33:
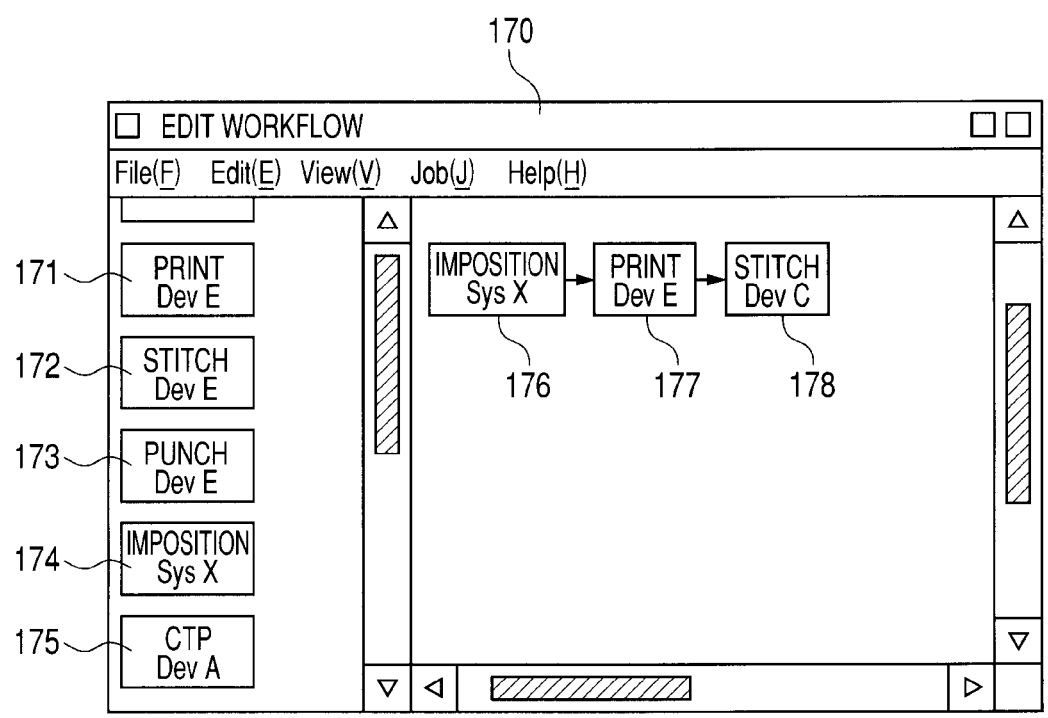
FIG. 33 is an example of a workflow edit screen (part 5).

FIG. 33 is an example of a workflow edit screen (part 5).

In FIG. 33, the printing process illustrated with 171 and 177 includes processes of stitching and punching. In the example illustrated in FIG. 33, a stitching process 178 is combined in addition to the stitching process included in 177.

Figure 34:
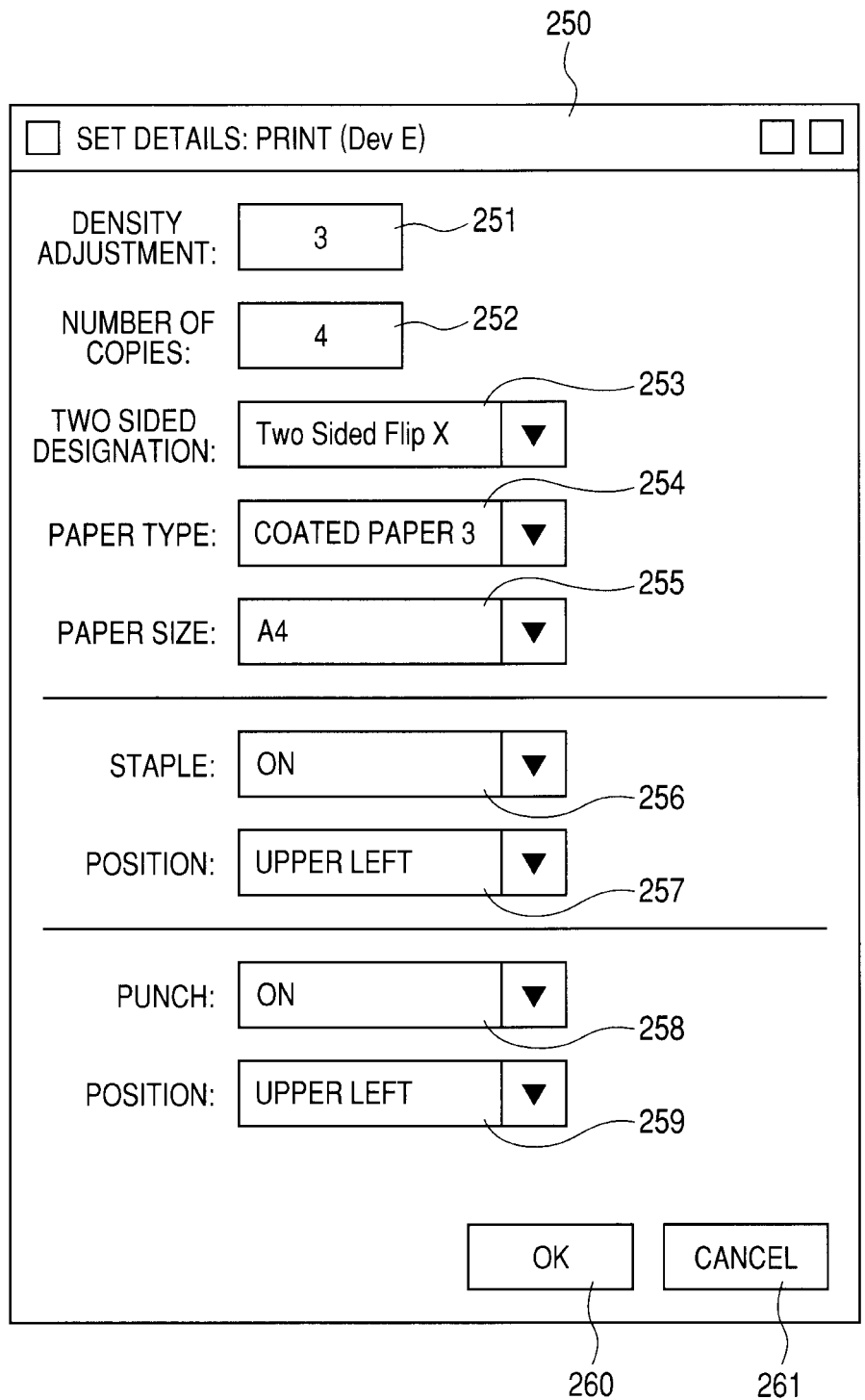
FIG. 34 is an example of a detail setting screen of 177 in FIG. 33.

FIG. 34 is an example of a detail setting screen of 177 in FIG. 33. As shown in FIG. 34, settings 256, 257, 258, and 259 related to stitching and punching are included.

Figure 35:
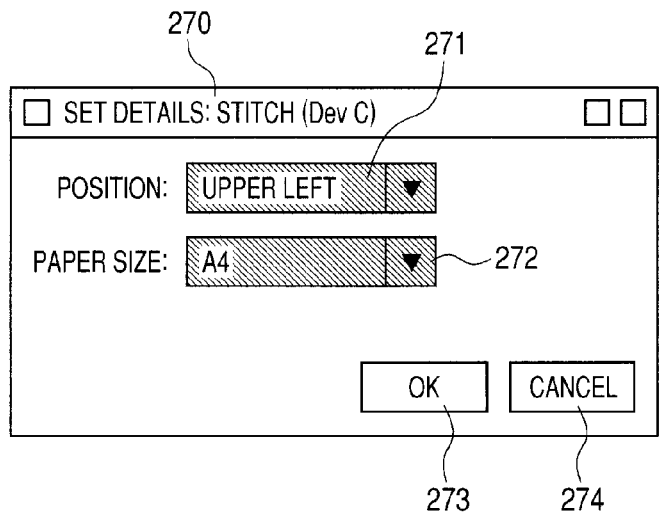
FIG. 35 is an example of a detail setting screen of 178 in FIG. 33.

FIG. 35 is an example of a detail setting screen of 178 in FIG. 33. In FIG. 35, settings 271 and 272 related to stitching are grayed out, indicating that the settings are ineffective.

As described, the workflow system 1 of the present embodiment determines whether an apparatus that executes an upstream process of the workflow includes a function for executing a downstream process of the workflow (determine overlapping function) based on, for example, the definition information of workflow. If the workflow system 1 determines that an apparatus that executes an upstream process of the workflow includes a function for executing a downstream process of the workflow, the workflow system 1 makes the setting related to the apparatus that executes the downstream process ineffective (invalidate).

Thus, the workflow system 1 of the present embodiment can prevent creating a workflow with inappropriately overlapped functions by making a downstream process ineffective if the same process exists in the upstream of the created workflow.

The number of combined processes significantly increases in a device with many types of functions if all combinations are automatically extracted. As a result, it is not easy for the user to select appropriate combinations when creating a workflow. The method of the present embodiment can solve such a user's inconvenience.

Fifth Embodiment

The basic configuration of a fifth embodiment is the same as in the first embodiment, and only differences from the first embodiment will be described.

In the fifth embodiment, if a device includes a plurality of functions, the performance data is internally partitioned into individual functions as in the first embodiment.

Figure 36:
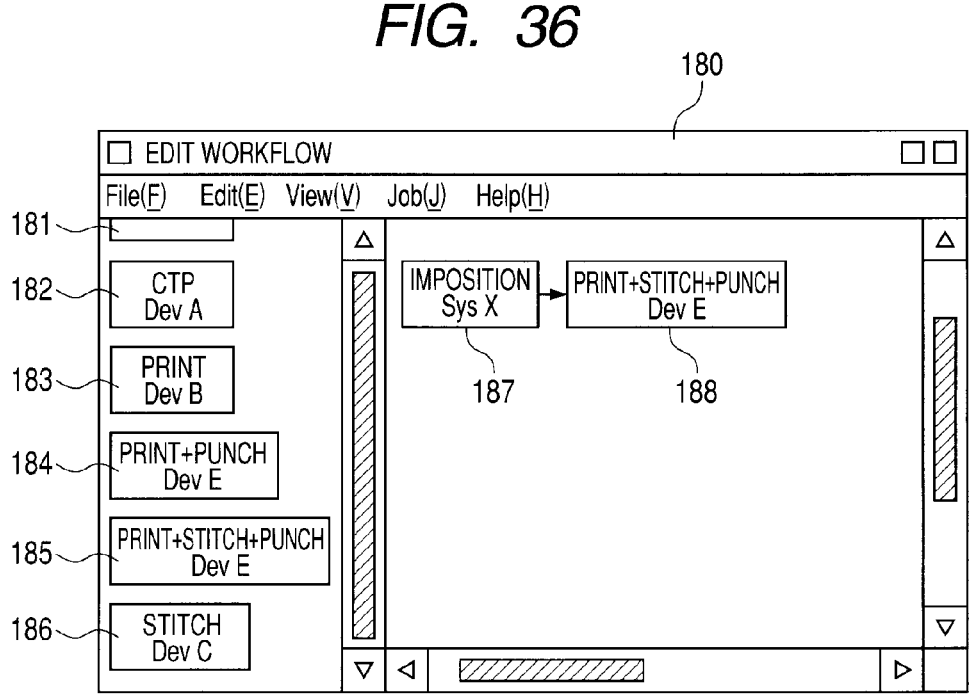
FIG. 36 is an example of a workflow edit screen (part 6).

FIG. 36 is an example of a workflow edit screen (part 6).

In FIG. 36, there is no combination of printing and stitching in "Dev E" in processes 181 to 186 displayed on the list. This is because there is "Dev C" for stitching, other than "Dev E". The workflow system 1 keeps the devices independent without creating a combined process because the function of stitching may overlap when the workflow is created.

As described, according to the present embodiment, the workflow system 1 partitions the data only if there is an overlapping function based on the partitioned functions, and in other cases, displays the icons in combinations. As a result, the number of combinations displayed in the list can be reduced, and the workflow can be edited only with effective combinations of processes.

Sixth Embodiment

The basic configuration of a sixth embodiment is the same as in the first embodiment, and only differences from the first embodiment will be described.

Figure 37:
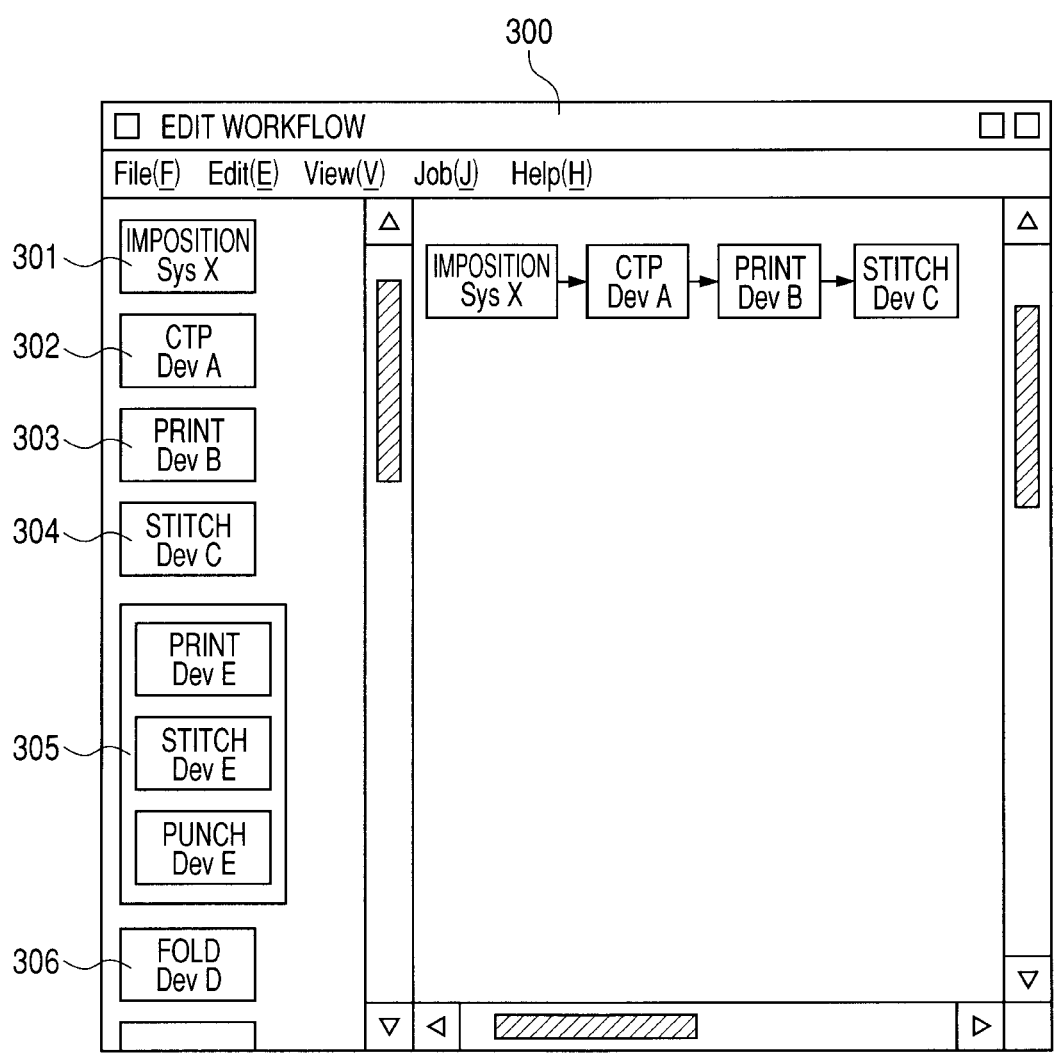
FIG. 37 is an example of a workflow edit screen (part 7).

FIG. 37 is an example of a workflow edit screen (part 7).

The workflow system 1 partitions the performance data, etc., into a plurality of functions included in a device, and as shown with 305 of FIG. 37, displays the functions in group on the workflow edit screen so as to indicate in the list that the functions belong to the same device.

As described, the workflow system 1 of the present embodiment groups the objects related to the performance data of the same device to generate a workflow edit screen and displays the objects on the display apparatus 13. This can prevent the user from being confused in the operation.

Seventh Embodiment

The basic configuration of a seventh embodiment is the same as in the first embodiment, and only differences from the first embodiment will be described.

Figure 38:
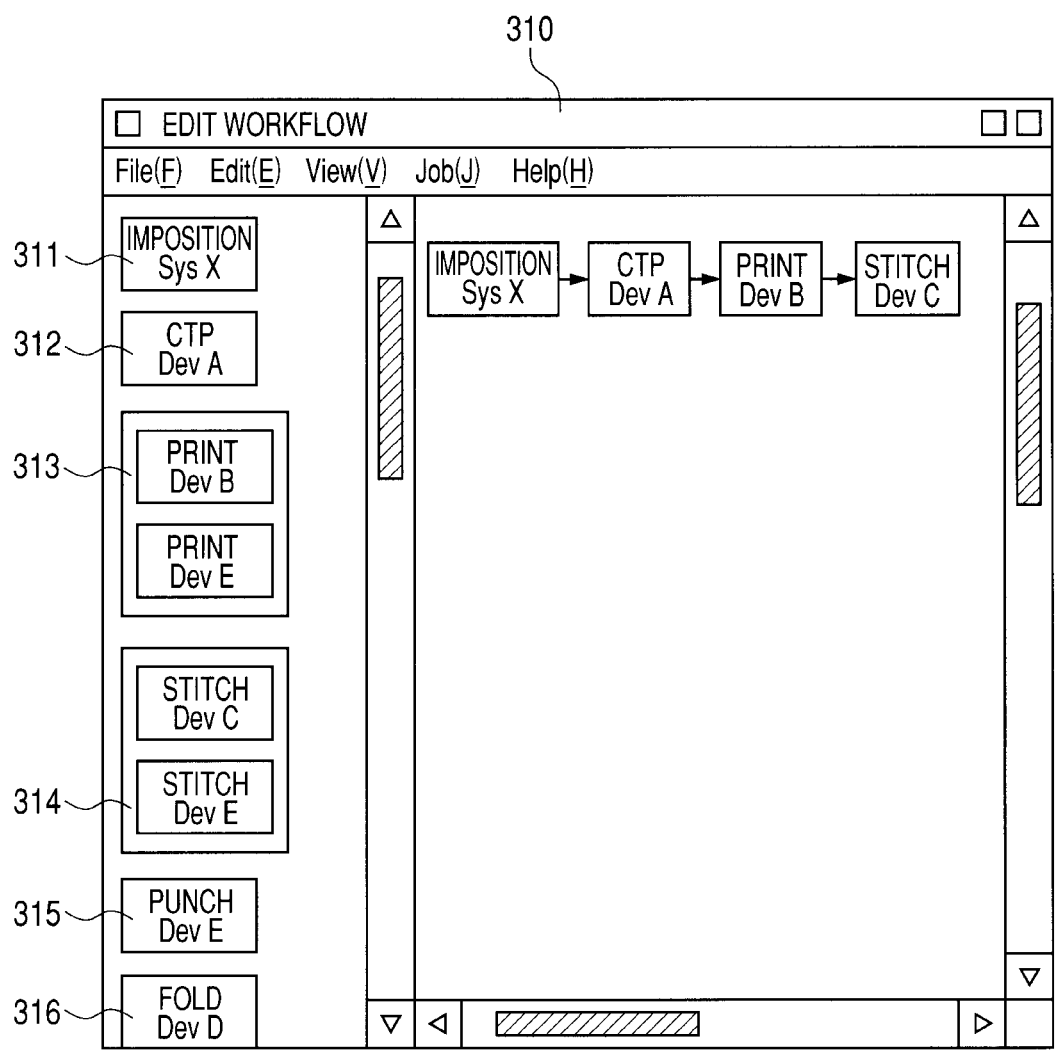
FIG. 38 is an example of a workflow edit screen (part 8).

FIG. 38 is an example of a workflow edit screen (part 8).

The workflow system 1 partitions the performance data, etc., into a plurality of functions included in a device, and as shown with 313 and 314 of FIG. 38, displays the same functions in groups on the workflow edit screen.

As described, the workflow system 1 of the present embodiment groups the object of performance data related to the same performance to generate a workflow edit screen and displays the objects on the display apparatus 13. This can prevent the user from being confused in the operation.

According to the present invention, a creating unit that can easily create a normal workflow can be provided to the user without impairing the scalability included in an existing workflow system.

Other Embodiments

An object of the present invention can be attained as follows. A storage medium (or recording medium) recording a program code of software for realizing the functions of the embodiments described above is supplied to a system or an apparatus. A central processor (CPU or MPU) of the system or the apparatus reads and executes the program code stored in the storage medium. In that case, the program code read from the storage medium realizes the functions of the embodiments described above, and the storage medium recording the program code constitutes the present invention.

The central processor of the system or the apparatus executes the read program code, and an operating system (OS) operating on the system or the apparatus executes part or all of the actual processes based on an instruction of the program code. The present invention includes the case of the process realizing the functions of the embodiments described above.

Furthermore, the program code read from the storage medium can be written into a memory included in a function expansion card inserted into the system or the apparatus or in a connected function expansion unit. A CPU included in the function expansion card or the function expansion unit executes part or all of the actual processes based on an instruction of the program code. The present invention includes the case of the process realizing the functions of the embodiments described above.

When the present invention is applied to the storage medium, a program code corresponding to the flow chart described above is stored in the storage medium (computer-readable storage medium).

According to the embodiments described above, the user who creates and sets a print workflow can easily discriminate an overlapping function in the workflow. As a result, an appropriate workflow can be easily created without impairing the flexible scalability included in an existing print workflow system used for offset printing, etc.

Thus, according to the embodiments described above, a creating unit that can easily create a normal workflow can be provided to the user without impairing the scalability included in an existing workflow system.

Although exemplary embodiments of the present invention have been described in detail, the present invention is not limited to specific embodiments. Various modifications and changes can be made within the scope of the present invention described in the claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-166430, filed Jun. 25, 2008, which is hereby incorporated by reference herein in its entirety.

What is claimed is:
1. An information processing apparatus comprising:
a creating unit that creates a workflow including a plurality of processes by selecting a first apparatus and a second apparatus from among a plurality of connected apparatuses, wherein functions of the first and second apparatuses overlap in part;
a first display control unit that displays workflow information indicating that the workflow created by the creating unit is performed by the first and second apparatuses;
a second display control unit that displays a first setting screen to set setting information of the first apparatus when the first apparatus is selected from the displayed workflow information; and a third display control unit that displays for the second apparatus a second setting screen to indicate that a user cannot set a setting on the function overlapping between the first and second apparatuses when the second apparatus is selected from the displayed workflow information.

2. The information processing apparatus according to claim 1, wherein the function of the first apparatus includes a printing function with stapling for executing a printing process based on print data and for stapling a printed material output in the printing process.

3. A control method comprising:
   a creating step of creating a workflow including a plurality of processes by selecting a first apparatus and a second apparatus from among a plurality of connected apparatuses, wherein functions of the first and second apparatuses overlap in part;
   a first displaying step of displaying workflow information indicating that the workflow created in the creating step is performed by the first and second apparatuses;
   a second displaying step of displaying a first setting screen to set setting information of the first apparatus when the first apparatus is selected from the displayed workflow information; and
   a third display step of displaying for the second apparatus a second setting screen to indicate that a user cannot set a setting on the function overlapping between the first and second apparatuses when the second apparatus is selected from the displayed workflow information.

4. A non-transitory computer-readable storage medium storing a program causing a computer to execute:
   a creating step of creating a workflow including a plurality of processes by selecting a first apparatus and a second apparatus from among the plurality of connected apparatuses, wherein functions of the first and second apparatuses overlap in part;
   a first displaying step of displaying workflow information indicating that the workflow created in the creating step is performed by the first and second apparatuses;
   a second displaying step that displays a first setting screen to set setting information of the first apparatus when the first apparatus is selected from the displayed workflow information; and
   a third displaying step of displaying for the second apparatus a second setting screen to indicate that a user cannot set a setting on the function overlapping between the first and second apparatuses when the second apparatus is selected from the displayed workflow information.

\* \* \* \* \*